(12) United States Patent
Gu et al.

(10) Patent No.: US 12,354,091 B2
(45) Date of Patent: Jul. 8, 2025

(54) METHOD, SYSTEM, AND COMPUTER PROGRAM PRODUCT FOR REAL-TIME DATA AGGREGATION

(71) Applicant: Visa International Service Associatio, San Francisco, CA (US)

(72) Inventors: Yu Gu, Austin, TX (US); Hongqin Song, Austin, TX (US); Ankit Talati, Austin, TX (US); Dirk Reinshagen, San Carlos, CA (US); Zandro Luis Gonzalez, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 193 days.

(21) Appl. No.: 16/963,675

(22) PCT Filed: Jan. 22, 2018

(86) PCT No.: PCT/US2018/014685
§ 371 (c)(1),
(2) Date: Jul. 21, 2020

(87) PCT Pub. No.: WO2019/143370
PCT Pub. Date: Jul. 25, 2019

(65) Prior Publication Data
US 2021/0073808 A1    Mar. 11, 2021

(51) Int. Cl.
*G06Q 20/38* (2012.01)
*G06F 7/08* (2006.01)
*G06Q 20/32* (2012.01)

(52) U.S. Cl.
CPC ........... *G06Q 20/3829* (2013.01); *G06F 7/08* (2013.01); *G06Q 20/3221* (2013.01); *G06Q 20/38* (2013.01)

(58) Field of Classification Search
USPC ........................................................ 705/44
See application file for complete search history.

(56) References Cited

U.S. PATENT DOCUMENTS 7,451,134 B2 * 11/2008 Krakowiecki ......... G06Q 40/03
8,086,528 B2 * 12/2011 Barrett ............... G06Q 20/4037
705/38

(Continued)

FOREIGN PATENT DOCUMENTS

WO    WO-2011116301 A2 *  9/2011   ............. G06Q 30/02

OTHER PUBLICATIONS

Title: Financial Transaction Manager Technical Overview Authors: Craig Bryce et al. Date: Mar. 2014 (Year: 2014).*

(Continued)

*Primary Examiner* — Gregory S Cunningham, II
*Assistant Examiner* — Yongsik Park
(74) *Attorney, Agent, or Firm* — The Webb Law Firm

(57) ABSTRACT

Provided is a method for aggregating data from real-time events (e.g., payment transactions). The method may include receiving event (e.g., transaction) data associated with a plurality of events (e.g., payment transactions). First aggregation of interest data associated with a type of aggregation of interest may be received. A first key associated with each event (e.g., transaction) may be determined based on a first portion of the event (e.g., transaction) data associated with each event (e.g., transaction) and the first aggregation of interest data. A first value based at least partially on a first plurality of the first keys associated with a first subset of the plurality of payment transactions may be communicated based on a first user request. A system and computer program product are also disclosed.

12 Claims, 8 Drawing Sheets

(56) References Cited

U.S. PATENT DOCUMENTS

| | | | | |
|---|---|---|---|---|
| 8,626,705 | B2* | 1/2014 | Barrett | G06Q 30/02 707/603 |
| 8,706,557 | B1* | 4/2014 | Tavares | G06Q 20/204 705/16 |
| 8,732,042 | B2* | 5/2014 | Hammad | G06Q 30/06 380/258 |
| 10,445,152 | B1* | 10/2019 | Zhang | G06F 16/1744 |
| 10,798,066 | B2* | 10/2020 | Chizi | H04L 9/0894 |
| 2001/0037332 | A1 | 11/2001 | Miller et al. | |
| 2002/0198824 | A1* | 12/2002 | Cook | G06Q 40/03 705/38 |
| 2009/0012848 | A1* | 1/2009 | Brooks | G06Q 30/0206 705/7.29 |
| 2009/0012927 | A1* | 1/2009 | Brooks | G06Q 30/02 706/52 |
| 2009/0132395 | A1* | 5/2009 | Lam | G06F 16/9535 705/30 |
| 2010/0125546 | A1* | 5/2010 | Barrett | G06Q 40/08 707/607 |
| 2010/0125547 | A1* | 5/2010 | Barrett | G06Q 40/03 707/607 |
| 2010/0262536 | A1* | 10/2010 | Barrett | G06F 16/24556 705/348 |
| 2011/0282748 | A1* | 11/2011 | Ciurea | G06Q 30/0267 705/14.64 |
| 2013/0024307 | A1* | 1/2013 | Fuerstenberg | G06Q 20/386 705/18 |
| 2013/0066771 | A1* | 3/2013 | Ciurea | G06Q 30/0241 705/39 |
| 2013/0124263 | A1* | 5/2013 | Amaro | G06Q 30/02 705/7.34 |
| 2013/0197991 | A1* | 8/2013 | Basu | G06Q 20/385 705/14.39 |
| 2013/0290234 | A1* | 10/2013 | Harris | G06Q 30/00 901/50 |
| 2013/0304648 | A1 | 11/2013 | O'Connell et al. | |
| 2014/0032265 | A1* | 1/2014 | Paprocki | G06Q 30/0255 705/7.29 |
| 2014/0040135 | A1* | 2/2014 | Ovick | G06Q 30/0207 705/44 |
| 2015/0154590 | A1* | 6/2015 | Ghosh | G06Q 30/0201 705/39 |
| 2015/0242835 | A1* | 8/2015 | Vaughan | G06Q 20/227 705/39 |
| 2016/0217446 | A1* | 7/2016 | Fordyce, III | G06Q 20/386 |

OTHER PUBLICATIONS

Corbett et al., "Spanner: Google's Globally-Distributed Database", ACM Transactions on Computer Systems, 2013, pp. 251-264, vol. 31, No. 3.

Kreps, "Introducing Kafka Streams: Stream Processing Made Simple", Confluent, 2016, 21 pages, retrieved from https://www.confluent.io/blog/introducing-kafka-streams-stream-processing-made-simple.

Tamborrino, "A Real-Time Reactive Platform for Data Integration and Event Stream Processing", Degree Project, In Information and Software Systems/Computer Science and Engineering , Second Level, 2014, 90 pages, Stockholm, Sweden.

Toshniwal et al., "Storm @ Twitter", SIGMOD, Jun. 22-27, 2014, pp. 147-156, Snowbird, Utah, USA.

Zaharia et al., "Discretized Streams: Fault-Tolerant Streaming Computation at Scale", Proceedings of the Twenty-Fourth ACM Symposium on Operating Systems Principles, 2013, pp. 423-438.

* cited by examiner

METHOD, SYSTEM, AND COMPUTER PROGRAM PRODUCT FOR REAL-TIME DATA AGGREGATION

CROSS-REFERENCE TO RELATED APPLICATION

This application is the United States national phase of International Application No. PCT/US2018/014685 filed Jan. 22, 2018, the disclosure of which is hereby incorporated by reference in its entirety.

BACKGROUND

1. Technical Field

This disclosure relates generally to systems, apparatus, and methods for data aggregation and, in non-limiting embodiments, to a method, system, and computer program product for real-time transaction data aggregation.

2. Technical Considerations

Service providers in electronic networks may process a high volume of events (e.g., messages) every day. For example, a transaction service provider system in an electronic payment processing network may process thousands of transactions (e.g., authorization requests and/or authorization responses) per second. To evaluate a current event, both long term (e.g., days, weeks, months, years) and short term (e.g., seconds, minutes) data aggregations may be useful. An aggregation may include a process and/or function by which multiple pieces of data (e.g., rows, entries, and/or the like from a database of event/transaction data) are grouped together to form a single value. For the purpose of illustration, an aggregation may be a count, an average, a maximum, a minimum, a median, a mode, a sum, and/or the like. Additionally, aggregations of data may show historical trends, behaviors, and/or the like associated with various attributes.

However, due to the high volume and rapid nature of events being processed, in some instances, it may be difficult to calculate/obtain sufficiently accurate data aggregations quickly (e.g., within a desired range of latency). For example, certain current techniques for processing data/event streams (e.g., Storm, Spark Streaming, or Kafka) may proactively store the state of all variables of potential interest for every predetermined time period of potential interest. Such techniques may result in storing a very large and/or constantly increasing number of states, many of which are never actually used, and therefore computing resources may be used inefficiently because a portion thereof may be devoted to (and wasted on) calculating and storing such states. Such large and/or increasing number of states may be referred to as a "state explosion." For example, assuming 100 aggregations with 10 different window sizes are desired for making a certain decision/evaluation, even assuming a coarse-grained half window size for an advance interval in typical hopping window implementations, 2,000 state updates may be propagated for a single incoming event (e.g., transaction), and assuming 1,000 transactions per second (TPS), 2 million input/output (IO) operations would occur each second. Moreover, such techniques may limit a user/requester of aggregations to only the predetermined time periods for such aggregations, thereby limiting the flexibility/precision of such aggregations. Alternatively, certain other current techniques store all incoming raw data (perhaps after some filtering) and wait to calculate any aggregations until requested. Such techniques may, upon receiving a request, search through the raw data directly to identify variables of interest identified in the request and then calculate the value of the requested aggregation. Such techniques may be very slow (e.g., high latency) because computing resources may be devoted to (and wasted on) checking a large amount of data to identify relatively small portions thereof relevant to the variables of interest.

Additionally, certain current techniques may include, in response to receiving a request for an aggregation from a user's device, transmitting back to that device all of the portions of the raw data identified as relevant to the variable of interest or only the proactively calculated aggregations for individual predetermined time periods. As such, the user's device may have to combine and/or perform calculations on the received raw data and/or partial aggregations to determine the final value of the aggregation of interest. However, such techniques may require transmitting a large amount of information over a network to the user's device, and therefore network resources may be used inefficiently because a portion thereof may be devoted to (and wasted on) transmitting such voluminous information. Further, the user's device may have relatively limited resources with respect to the computing systems of the service provider from which the user's device requested the information. As such, the limited computing resources of the user's device may be used inefficiently because a portion thereof may be devoted to (and wasted on) calculating aggregations.

SUMMARY OF THE INVENTION

Accordingly, the present disclosure provides improved systems, methods, systems, and computer program product for data aggregation.

According to non-limiting embodiments, provided is a method for aggregating data from events (e.g., payment transactions). In some non-limiting embodiments, a method for aggregating data from payment transactions may include receiving, with at least one processor, transaction data associated with a plurality of payment transactions. First aggregation of interest data associated with a type of aggregation of interest may be received. A first key associated with each transaction of the plurality of payment transactions may be determined based on a first portion of the transaction data associated with each transaction of the plurality of payment transactions and the first aggregation of interest data. A first value based on a first plurality of the first keys associated with a first subset of the plurality of payment transactions may be communicated based on a first user request.

According to non-limiting embodiments, provided is a system for aggregating data from payment transactions. In some non-limiting embodiments, the system for aggregating data from payment transactions may include at least one processor, where the at least one processor may be programmed or configured to receive, from an electronic payment network, transaction data associated with a plurality of payment transactions. The processor may be further configured to receive, from a client device, first aggregation of interest data associated with a type of aggregation of interest. The processor may further be configured to determine a first key associated with each transaction of the plurality of payment transactions based on a first portion of the transaction data associated with each transaction of the plurality of payment transactions and the first aggregation of interest data. The processor may further be configured to communicate, to the client device, a first value based on a first plurality of the first keys associated with a first subset of the plurality of payment transactions based on a first user request.

According to non-limiting embodiments, provided is a computer program product for aggregating data from payment transactions. The computer program product may include at least one non-transitory computer-readable medium including one or more instructions that, when executed by at least one processor, cause the at least one processor to receive transaction data associated with a plurality of payment transactions. The instructions may further cause the processor to receive first aggregation of interest data associated with a type of aggregation of interest. The instructions may further cause the processor to determine a first key associated with each transaction of the plurality of payment transactions based on a first portion of the transaction data associated with each transaction of the plurality of payment transactions and the first aggregation of interest data. The instructions may further cause the processor to communicate a first value based on a first plurality of the first keys associated with a first subset of the plurality of payment transactions based on a first user request.

Further embodiments or aspects are set forth in the following numbered clauses:

Clause 1: A method for aggregating data from payment transactions, comprising: receiving, with at least one processor, transaction data associated with a plurality of payment transactions; receiving, with at least one processor, first aggregation of interest data associated with a type of aggregation of interest; determining, with at least one processor, a first key associated with each transaction of the plurality of payment transactions based on a first portion of the transaction data associated with each transaction of the plurality of payment transactions and the first aggregation of interest data; and communicating, with at least one processor, a first value based on a first plurality of the first keys associated with a first subset of the plurality of payment transactions based on a first user request.

Clause 2: The method of clause 1, further comprising: storing, with at least one processor, a second portion of the transaction data associated with each transaction of the plurality of payment transactions in a map data structure based on the first key of the respective transaction of the plurality of payment transactions, wherein the first portion of the transaction data and the second portion of the transaction data are different.

Clause 3: The method of clauses 1 or 2, wherein the first value is further based on the second portion of the transaction data associated with each key of the first plurality of the first keys associated with the first subset of the plurality of payment transactions.

Clause 4: The method of any of clauses 1-3, further comprising: determining, with at least one processor, a time duration of interest based on the first aggregation of interest data associated with the type of aggregation of interest; dividing, with at least one processor, the map data structure into a plurality of time-based map data structures, each time-based map data structure comprising a second plurality of the first keys and the second portion of the transaction data corresponding thereto associated with a second subset of the plurality of payment transactions, each second plurality of the first keys comprising all first keys associated with a time period having a time duration equal to the time duration of interest, wherein the time period for each second plurality of the first keys is different than the time period for each other second plurality of the first keys; and storing, with at least one processor, the plurality of time-based map data structures on a plurality of servers, wherein each server of the plurality of servers stores at least one of the time-based map data structures.

Clause 5: The method of any of clauses 1-4, further comprising: calculating, with at least one processor, at each server of the plurality of servers, a second value based on at least one of the second plurality of the first keys and the second portion of the transaction data corresponding thereto associated with each transaction of the second subset of the plurality of payment transactions stored thereon; and storing, with at least one processor, at each server of the plurality of servers, the second value.

Clause 6: The method of any of clauses 1-5, further comprising: receiving, with at least one processor, second aggregation of interest data associated with a second type of aggregation of interest; determining, with at least one processor, a second key associated with each transaction of the plurality of payment transactions based on the second portion of the transaction data associated with each transaction of the plurality of payment transactions and the second aggregation of interest data, wherein storing the second portion of the transaction data comprises storing, with at least on processor, the second key associated with each transaction of the plurality of payment transactions in the map data structure based on the first key of the respective transaction of the plurality of payment transactions, wherein the first key and the second key are different; and sorting, with at least one processor, the second keys associated with the plurality of payment transactions based on the second aggregation of interest data.

Clause 7: The method of any of clauses 1-6, further comprising: sorting, with at least one processor, the first keys associated with the plurality of payment transactions based on the first aggregation of interest data.

Clause 8: The method of any of clauses 1-7, further comprising: receiving, with at least one processor from a user client, the first user request, the first user request comprising a request for the first value based on the first aggregation of interest data associated with the type of aggregation of interest and time period data associated with a first time period of interest; identifying, with at least one processor, the first plurality of the first keys based on the first aggregation of interest data and the time period data; and calculating, with at least one processor, the first value based on the first plurality of the first keys.

Clause 9: The method of any of clauses 1-8, further comprising, after receiving the transaction data associated with the plurality of payment transactions and before determining the first key associated with each transaction of the plurality of payment transactions, at least one of: filtering, with at least one processor, a third portion of the transaction data associated with each transaction of the plurality of payment transactions; and encrypting, with at least one processor, the transaction data associated with each transaction of the plurality of payment transactions.

Clause 10: The method of any of clauses 1-9, wherein the first user request comprises time period data associated with a first time period of interest, the method further comprising: calculating, with at least one processor, a first set of aggregation values based on the transaction data associated with a second subset of the plurality of payment transactions associated with each of a plurality of first predetermined time periods; calculating, with at least one processor, a second set of aggregation values based on the transaction data associated with a third subset of the plurality of payment transactions associated with each of a plurality of second predetermined time periods; calculating, with at least one processor, a second value based on the first plurality of the first keys associated with the first subset of the plurality of payment transactions, wherein the first subset of the plurality of payment transactions is associated with a portion of the first time period of interest outside of the plurality of first predetermined time periods and the plurality of second predetermined time periods; and calculating, with at least one processor, the first value based on a subset of the first set of aggregation values within the first time period of interest, a subset of the second set of aggregation values within the first time period of interest, and the second value.

Clause 11: The method of any of clauses 1-10, wherein each of the plurality of first predetermined time periods has a first duration and each of the plurality of second predetermined time periods has a second duration, and further wherein the second duration is greater than the first duration.

Clause 12: The method of any of clauses 1-11, wherein the first duration is an hour and the second duration is a day.

Claus 13: A system for aggregating data from payment transactions, comprising: at least one processor, wherein the at least one processor is programmed or configured to: receive, from an electronic payment network, transaction data associated with a plurality of payment transactions; receive, from a client device, first aggregation of interest data associated with a type of aggregation of interest; determine a first key associated with each transaction of the plurality of payment transactions based on a first portion of the transaction data associated with each transaction of the plurality of payment transactions and the first aggregation of interest data; and communicate, to the client device, a first value based on a first plurality of the first keys associated with a first subset of the plurality of payment transactions based on a first user request.

Clause 14: The system of clause 13, wherein the at least one processor is further programmed or configured to: store a second portion of the transaction data associated with each transaction of the plurality of payment transactions in a map data structure based on the first key of the respective transaction of the plurality of payment transactions, wherein the first portion of the transaction data and the second portion of the transaction data are different.

Clause 15: The system of clauses 13 or 14 wherein the first value is further based on the second portion of the transaction data associated with each key of the first plurality of the first keys associated with the first subset of the plurality of payment transactions.

Clause 16: The system of any of clauses 13-15, wherein the at least one processor is further programmed or configured to: determine a time duration of interest based on the first aggregation of interest data associated with the type of aggregation of interest; divide the map data structure into a plurality of time-based map data structures, each time-based map data structure comprising a second plurality of the first keys and the second portion of the transaction data corresponding thereto associated with a second subset of the plurality of payment transactions, each second plurality of the first keys comprising all first keys associated with a time period having a time duration equal to the time duration of interest, wherein the time period for each second plurality of the first keys is different than the time period for each other second plurality of the first keys; and store the plurality of time-based map data structures on a plurality of servers, wherein each server of the plurality of servers stores at least one of the time-based map data structures.

Clause 17: The system of any of clauses 13-16, wherein the at least one processor is further programmed or configured to: calculate, at each server of the plurality of servers, a second value based on at least one of the second plurality of the first keys and the second portion of the transaction data corresponding thereto associated with each transaction of the second subset of the plurality of payment transactions stored thereon; and store, at each server of the plurality of servers, the second value.

Clause 18: The system of any of clauses 13-17, wherein the at least one processor is further programmed or configured to: receive second aggregation of interest data associated with a second type of aggregation of interest; determine a second key associated with each transaction of the plurality of payment transactions based on the second portion of the transaction data associated with each transaction of the plurality of payment transactions and the second aggregation of interest data, wherein storing the second portion of the transaction data comprises storing, with at least on processor, the second key associated with each transaction of the plurality of payment transactions in the map data structure based on the first key of the respective transaction of the plurality of payment transactions, wherein the first key and the second key are different; and sort the second keys associated with the plurality of payment transactions based on the second aggregation of interest data.

Clause 19: The system of any of clauses 13-18, wherein the at least one processor is further programmed or configured to: sort the first keys associated with the plurality of payment transactions based on the first aggregation of interest data.

Clause 20: The system of any of clauses 13-19, wherein the at least one processor is further programmed or configured to: receive, from a user client, the first user request, the first user request comprising a request for the first value based on the first aggregation of interest data associated with the type of aggregation of interest and time period data associated with a first time period of interest; identify the first plurality of the first keys based on the first aggregation of interest data and the time period data; and calculate the first value based on the first plurality of the first keys.

Clause 21: The system of any of clauses 13-20, wherein the at least one processor is further programmed or configured to, after receiving the transaction data associated with the plurality of payment transactions and before determining the first key associated with each transaction of the plurality of payment transactions, at least one of: filter a third portion of the transaction data associated with each transaction of the plurality of payment transactions; and encrypt the transaction data associated with each transaction of the plurality of payment transactions.

Clause 22: The system of any of clauses 13-21 wherein the first user request comprises time period data associated with a first time period of interest, and wherein the at least one processor is further programmed or configured to: calculate a first set of aggregation values based on the transaction data associated with a second subset of the plurality of payment transactions associated with each of a plurality of first predetermined time periods; calculate a second set of aggregation values based on the transaction data associated with a third subset of the plurality of payment transactions associated with each of a plurality of second predetermined time periods; calculate a second value based on the first plurality of the first keys associated with the first subset of the plurality of payment transactions, wherein the first subset of the plurality of payment transactions is associated with a portion of the first time period of interest outside of the plurality of first predetermined time periods and the plurality of second predetermined time periods; and calculate the first value based on a subset of the first set of aggregation values within the first time period of interest, a subset of the second set of aggregation values within the first time period of interest, and the second value.

Clause 23: The system of any of clauses 13-22, wherein each of the plurality of first predetermined time periods has a first duration and each of the plurality of second predetermined time periods has a second duration, and further wherein the second duration is greater than the first duration.

Clause 24: The system of any of clauses 13-23, wherein the first duration is an hour and the second duration is a day.

Clause 25: A computer program product for aggregating data from payment transactions, the computer program product comprising at least one non-transitory computer-readable medium including one or more instructions that, when executed by at least one processor, cause the at least one processor to: receive transaction data associated with a plurality of payment transactions; receive first aggregation of interest data associated with a type of aggregation of interest; determine a first key associated with each transaction of the plurality of payment transactions based on a first portion of the transaction data associated with each transaction of the plurality of payment transactions and the first aggregation of interest data; and communicate a first value based on a first plurality of the first keys associated with a first subset of the plurality of payment transactions based on a first user request.

Clause 26: The computer program product of clause 25, wherein the one or more instructions, when executed by the at least one processor, further cause the at least one processor to: store a second portion of the transaction data associated with each transaction of the plurality of payment transactions in a map data structure based on the first key of the respective transaction of the plurality of payment transactions, wherein the first portion of the transaction data and the second portion of the transaction data are different.

Clause 27: The computer program product of clauses 25 or 26, wherein the first value is further based on the second portion of the transaction data associated with each key of the first plurality of the first keys associated with the first subset of the plurality of payment transactions.

Clause 28: The computer program product of any of clauses 25-27, wherein the one or more instructions, when executed by the at least one processor, further cause the at least one processor to: determine a time duration of interest based on the first aggregation of interest data associated with the type of aggregation of interest; divide the map data structure into a plurality of time-based map data structures, each time-based map data structure comprising a second plurality of the first keys and the second portion of the transaction data corresponding thereto associated with a second subset of the plurality of payment transactions, each second plurality of the first keys comprising all first keys associated with a time period having a time duration equal to the time duration of interest, wherein the time period for each second plurality of the first keys is different than the time period for each other second plurality of the first keys; and store the plurality of time-based map data structures on a plurality of servers, wherein each server of the plurality of servers stores at least one of the time-based map data structures.

Clause 29: The computer program product of any of clauses 25-28, wherein the one or more instructions, when executed by the at least one processor, further cause the at least one processor to: calculate, at each server of the plurality of servers, a second value based on at least one of the second plurality of the first keys and the second portion of the transaction data corresponding thereto associated with each transaction of the second subset of the plurality of payment transactions stored thereon; and store, at each server of the plurality of servers, the second value.

Clause 30: The computer program product of any of clauses 25-29, wherein the one or more instructions, when executed by the at least one processor, further cause the at least one processor to: receive second aggregation of interest data associated with a second type of aggregation of interest; determine a second key associated with each transaction of the plurality of payment transactions based on the second portion of the transaction data associated with each transaction of the plurality of payment transactions and the second aggregation of interest data, wherein storing the second portion of the transaction data comprises storing, with at least on processor, the second key associated with each transaction of the plurality of payment transactions in the map data structure based on the first key of the respective transaction of the plurality of payment transactions, wherein the first key and the second key are different; and sort the second keys associated with the plurality of payment transactions based on the second aggregation of interest data.

Clause 31: The computer program product of any of clauses 25-30, wherein the one or more instructions, when executed by the at least one processor, further cause the at least one processor to: sort the first keys associated with the plurality of payment transactions based on the first aggregation of interest data.

Clause 32: The computer program product of any of clauses 25-31, wherein the one or more instructions, when executed by the at least one processor, further cause the at least one processor to: receive, from a user client, the first user request, the first user request comprising a request for the first value based on the first aggregation of interest data associated with the type of aggregation of interest and time period data associated with a first time period of interest; identify the first plurality of the first keys based on the first aggregation of interest data and the time period data; and calculate the first value based on the first plurality of the first keys.

Clause 33: The computer program product of any of clauses 25-32, wherein the at least one processor is further programmed or configured to, after receiving the transaction data associated with the plurality of payment transactions and before determining the first key associated with each transaction of the plurality of payment transactions, at least one of: filter a third portion of the transaction data associated with each transaction of the plurality of payment transactions; and encrypt the transaction data associated with each transaction of the plurality of payment transactions.

Clause 34: The computer program product of any of clauses 25-33, wherein the first user request comprises time period data associated with a first time period of interest, and wherein the one or more instructions, when executed by the at least one processor, further cause the at least one processor to: calculate a first set of aggregation values based on the transaction data associated with a second subset of the plurality of payment transactions associated with each of a plurality of first predetermined time periods; calculate a second set of aggregation values based on the transaction data associated with a third subset of the plurality of payment transactions associated with each of a plurality of second predetermined time periods; calculate a second value based on the first plurality of the first keys associated with the first subset of the plurality of payment transactions, wherein the first subset of the plurality of payment transactions is associated with a portion of the first time period of interest outside of the plurality of first predetermined time periods and the plurality of second predetermined time periods; and calculate the first value based on a subset of the first set of aggregation values within the first time period of interest, a subset of the second set of aggregation values within the first time period of interest, and the second value.

Clause 35: The computer program product of any of clauses 25-34, wherein each of the plurality of first predetermined time periods has a first duration and each of the plurality of second predetermined time periods has a second duration, and further wherein the second duration is greater than the first duration.

Clause 36: The computer program product of any of clauses 25-35, wherein the first duration is an hour and the second duration is a day.

Clause 37: A method for aggregating data from payment transactions, comprising: receiving, with at least one processor, transaction data associated with a plurality of payment transactions; receiving, with at least one processor, first aggregation of interest data associated with a type of aggregation of interest; determining, with at least one processor, a first key associated with each transaction of the plurality of payment transactions based on a first portion of the transaction data associated with each transaction of the plurality of payment transactions and the first aggregation of interest data; storing, with at least one processor, a second portion of the transaction data associated with each transaction of the plurality of payment transactions in a map data structure based on the first key of the respective transaction of the plurality of payment transactions, wherein the first portion of the transaction data and the second portion of the transaction data are different; sorting, with at least one processor, the first keys associated with the plurality of payment transactions based on the first aggregation of interest data; identifying, with at least one processor, a first plurality of the first keys associated with a first subset of the plurality of payment transactions based on the first aggregation of interest data and a first user request; and communicating, with at least one processor, a first value based on at least one of the first plurality of the first keys and the second portion of the transaction data associated with each key of the first plurality of the first keys associated with the first subset of the plurality of payment transactions based on a first user request.

Clause 38: A method for aggregating data from payment transactions, comprising: receiving, with at least one processor, transaction data associated with a plurality of payment transactions; receiving, with at least one processor, first aggregation of interest data associated with a type of aggregation of interest; determining, with at least one processor, a first key associated with each transaction of the plurality of payment transactions based on a first portion of the transaction data associated with each transaction of the plurality of payment transactions and the first aggregation of interest data; calculating, with at least one processor, a first set of aggregation values based on the transaction data associated with a second subset of the plurality of payment transactions associated with each of a plurality of first predetermined time periods; calculating, with at least one processor, a second set of aggregation values based on the transaction data associated with a third subset of the plurality of payment transactions associated with each of a plurality of second predetermined time periods; receiving, with at least one processor, a user request comprising time period data associated with a first time period of interest; calculating, with at least one processor, a second value based on a first plurality of the first keys associated with a first subset of the plurality of payment transactions, wherein the first subset of the plurality of payment transactions is associated with a portion of the first time period of interest outside of the plurality of first predetermined time periods and the plurality of second predetermined time periods; calculating, with at least one processor, a first value based on a subset of the first set of aggregation values within the first time period of interest, a subset of the second set of aggregation values within the first time period of interest, and the second value; and communicating, with at least one processor, the first value based on the first user request.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

DETAILED DESCRIPTION

Figure 1:
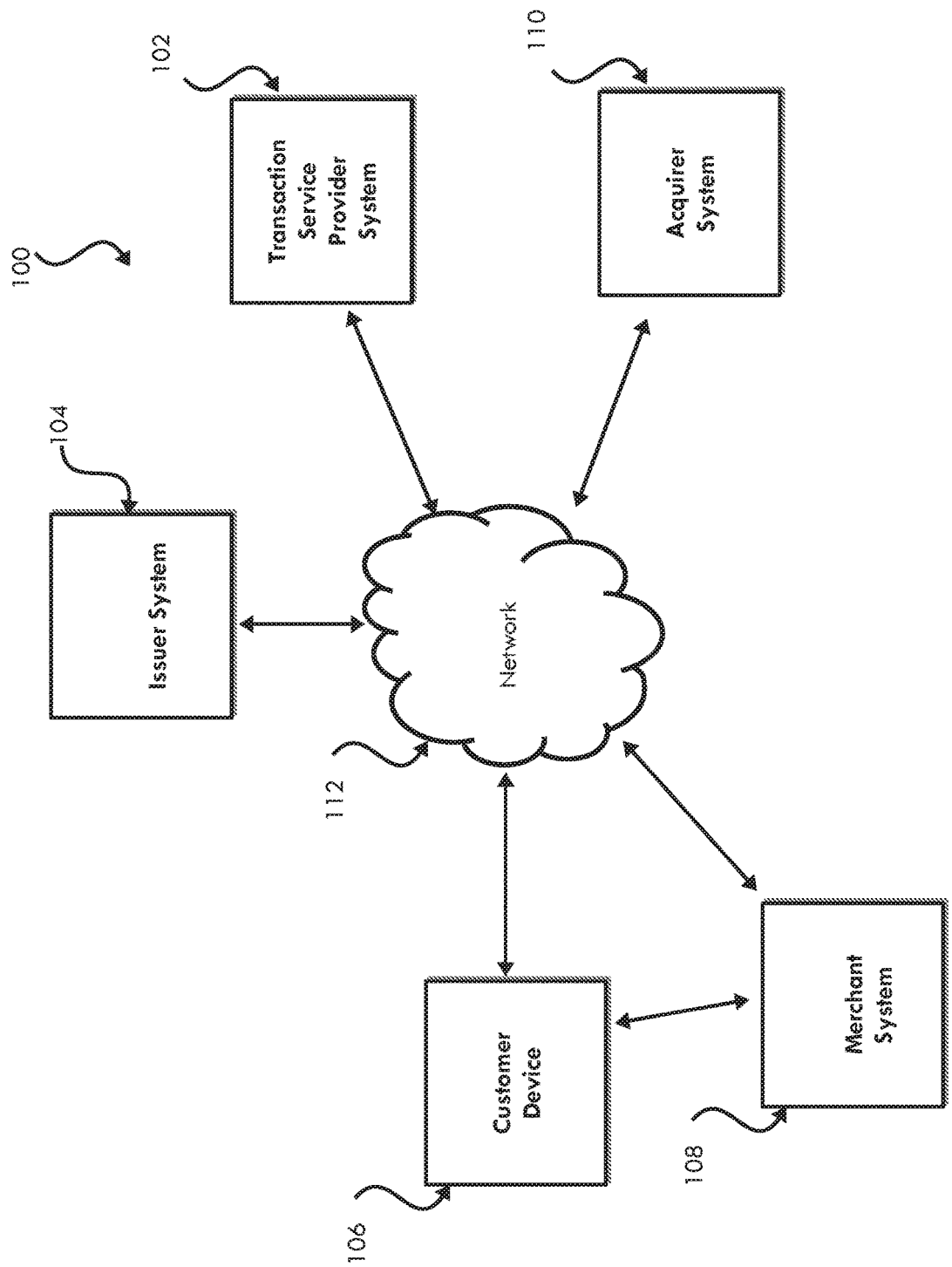
FIG. 1 is a diagram of a non-limiting embodiment of an environment in which systems, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "token" may refer to an identifier that is used as a substitute or replacement identifier for an account identifier, such as a PAN. Tokens may be associated with a PAN or other account identifiers in one or more data structures (e.g., one or more databases, and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed systems, methods, and computer program products for aggregation of data, including, but not limited to, real-time event data such as transaction data from an electronic payment network. For example, non-limiting embodiments or aspects of the disclosed subject matter provide determining one or more key(s) based on one or more portion(s) of the data for each event (e.g., transaction). Such embodiments or aspects provide the techniques and systems for quickly and efficiently determining values for requested aggregations through using the key(s) to efficiently store and/or sort the data in one or more map data structure(s) such that data is highly accessible (e.g., data entries can be quickly searched to identify relevant entries by searching just the (sorted) key(s) associated with each entry) and computation can be reduced, for example, in comparison to techniques that search through raw data directly. Moreover, the aggregations may be determined/calculated reactively, e.g., only in response to user requests, without the need to proactively calculate/store the state of all variables of potential interest for every predetermined time period of potential interest, thus providing the advantage of saving the computing resources such proactive techniques devote to calculate and store such information while providing similarly low latency and greater flexibility.

Additionally or alternatively, non-limiting embodiments or aspects of the disclosed subject matter provide the techniques and systems for balancing reactive and proactive determination of aggregation values. For example, non-limiting embodiments or aspects of the disclosed subject matter may proactively determine aggregations for longer term periods (e.g., hours, days, weeks, months, years) and reactively determine aggregations for shorter term periods. Such embodiments or aspects may include dividing a requested time period into portions for which proactively calculated aggregations have been determined (e.g., full days and/or full hours within the one-week period prior to the current time) and a remaining portion for which proactively calculated aggregations have not been determined (e.g., a portion of an hour between the current time and the next hour) so that an aggregation may be determined using the key(s) corresponding to just the data entries within the remaining portion of time. Thus, such embodiments or aspects provide the advantage of trading off/balancing the low latency of having some proactively determined aggregations (without devoting too much computing resources since proactive aggregations are limited to (longer-term) predetermined periods) with the flexibility of reactive determination of aggregations for the remaining portion of a requested time period (without overly increasing the latency since reactive aggregations are limited to (shorter-term) portions of the time period).

Additionally or alternatively, non-limiting embodiments or aspects of the disclosed subject matter provide determining/calculating the value of a requested aggregation at the system (e.g., server, device, and/or the like) in which the data is stored and communicating the value of the requester. For example, the request from a client device/system may include the aggregation(s) desired, and the response to that request may include the final value(s) of the aggregation(s) after such value(s) are determined/calculated. As such, embodiments or aspects of the disclosed subject matter provide the advantage of limiting the amount of information (e.g., indications of desired aggregations and/or final values thereof rather than raw data and/or values of proactively determined portions of the aggregations) communicated over a network connecting the client to the system storing the data, thereby reducing bandwidth and/or decreasing the use of other network resources. Additionally or alternatively, embodiments or aspects of the disclosed subject matter provide the advantage of determining/calculating the value of the requested aggregations at the system where the data is stored rather than at the client device that requested the data, thereby preserving computing resources of the client device (which may have less computing power/resources than the system on which data is stored) and reducing latency (e.g., since determinations/calculations are performed at a system with relatively greater computing power/resources than the client device and less information is communicated over the network).

For the purpose of illustration, in the following description, the present disclosed subject matter is described with respect to systems, methods, and computer program products for aggregating data from payment transactions, one skilled in the art will recognize that the disclosed subject matter is not limited to the illustrative embodiments. For example, the systems, methods, and computer program products described herein may be used with a wide variety of settings, such as aggregating data related to other types of events, messages, and/or interactions involving any device(s), system(s), network(s), and/or combinations thereof, or any other suitable setting for providing data aggregations.

Referring now to FIG. 1, FIG. 1 is a diagram of a non-limiting embodiment of an environment 100 in which systems, apparatus, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. For example, customer device 106 may include a client device and/or the like. In some non-limiting embodiments, customer device 106 may or may not be capable of receiving information (e.g., from merchant system 108) via a short-range wireless communication connection (e.g., an NFC communication connection, an RFID communication connection, a Bluetooth® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., along-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of environment 100 may perform one or more functions described as being performed by another set of systems or another set of devices of environment 100.

Figure 2:
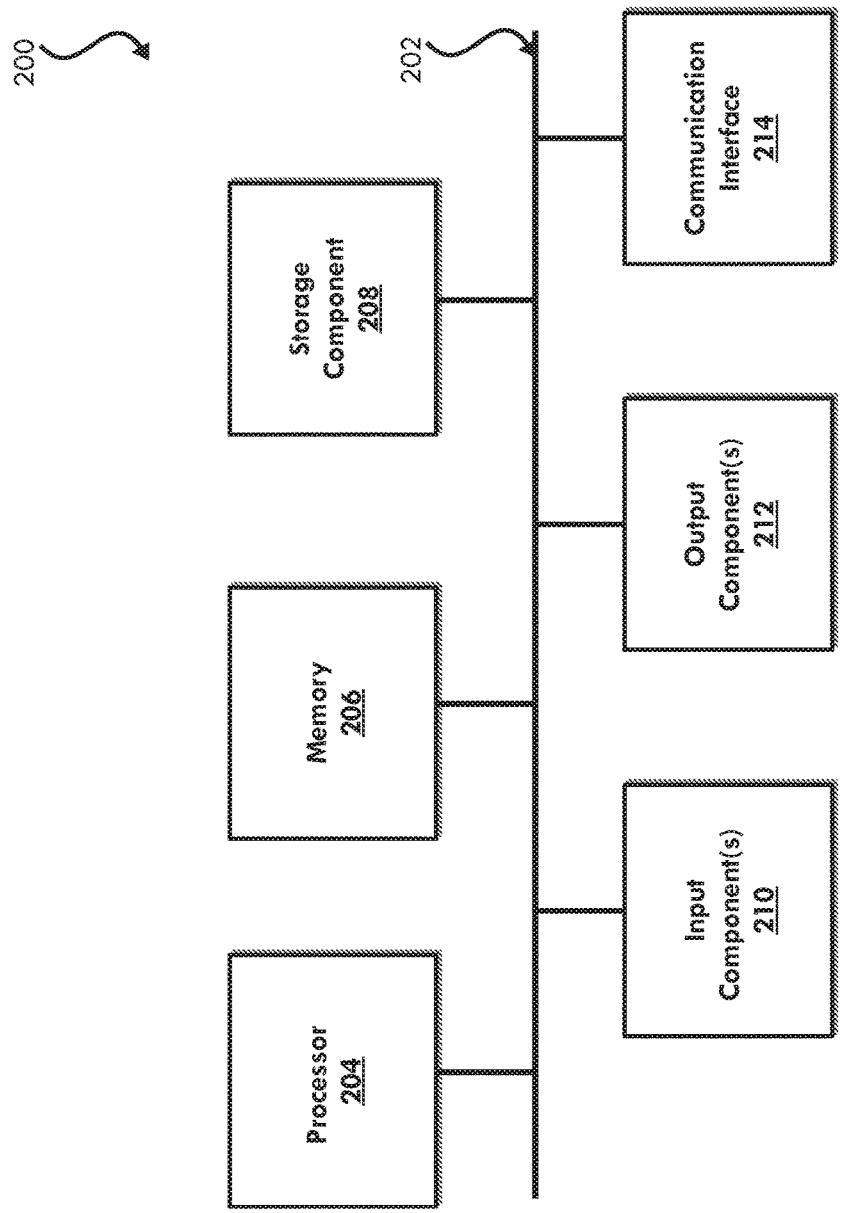
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
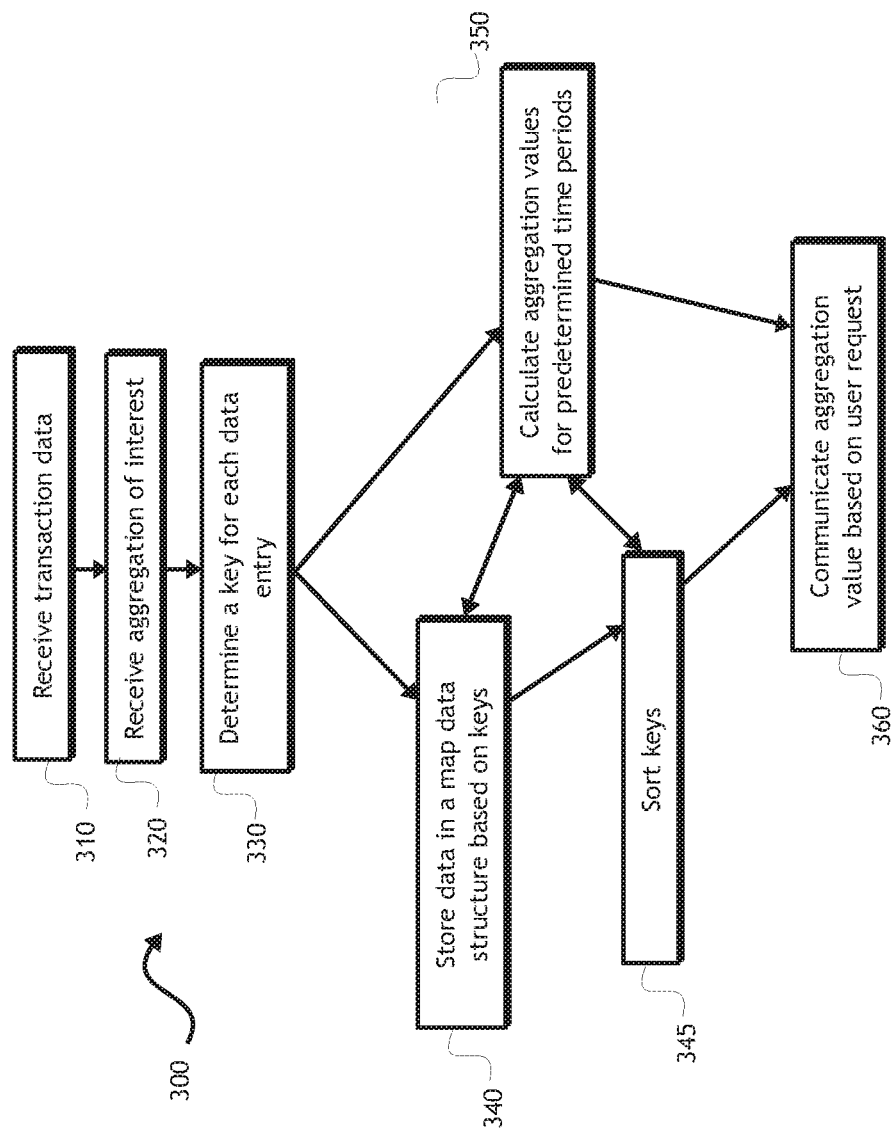
FIG. 3 is a flowchart of non-limiting embodiments of a process for data aggregation according to the principles of the present disclosure.

Referring now to FIG. 3, FIG. 3 is a flowchart of non-limiting embodiments of a process 300 for aggregating data from events (e.g., payment transactions). In some non-limiting embodiments, one or more of the steps of process 300 may be performed (e.g., completely, partially, and/or the like) by transaction service provider system 102. In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), or acquirer system 110 (e.g., one or more devices of acquirer system 110).

As shown in FIG. 3, at step 310, process 300 may include receiving data (e.g., event or transaction data). For example, transaction service provider system 102 may receive transaction data associated with a plurality of payment transactions from an electronic payment network (e.g., network 112). Additionally or alternatively, the transaction data (or a portion thereof) may be received from a database, an application programming interface (API) coupled to another device and/or system (e.g., issuer system 104, customer device 106, merchant system 108, or acquirer system 110), and/or a messaging cluster (e.g., a Kafka messaging cluster). In some non-limiting embodiments, transaction service provider system 102 may include a messaging cluster, and the data may be received at the messaging cluster in one or more streams.

In some non-limiting embodiments, a portion of the data may be filtered after receipt thereof. For example, transaction service provider system 102 may filter a portion of the transaction data associated with each transaction of the plurality of payment transactions. In some non-limiting embodiments, filtering may include discarding the filtered portion of the data based on the type(s) of aggregations of interest, as described herein. For example, if some portion(s) of the transaction data will not be used to calculate any identified aggregations of interest, such portion(s) may be filtered out so that only the relevant portions (e.g., portions potentially usable to calculate at least one aggregation of interest) are processed and/or stored, as described herein.

In some non-limiting embodiments, at least a portion of the data may be encrypted after receipt thereof. For example, transaction service provider system 102 may encrypt all of or a portion of the transaction data associated with each transaction of the plurality of payment transactions. The encryption may include any suitable cryptographic technique to protect the privacy of the data or portions thereof.

As shown in FIG. 3, at step 320, process 300 may include receiving aggregation of interest data. For example, transaction service provider system 102 (or a device thereof) may receive first aggregation of interest data associated with a type of aggregation of interest from a client device (e.g., a device of issuer system 104, a customer device 106, a device of merchant system 108, a device of acquirer system 110, and/or another device of transaction service provider system 102). The first aggregation of interest data may be any suitable indication or information that identifies at least one type of aggregation of interest. For example, the first aggregation of interest data may be included in a configuration file identifying one or more aggregations of interest. Additionally or alternatively, the first aggregation of interest data may be included in a request from a client device that also includes a request for a particular aggregation, as described herein.

In some non-limiting embodiments, second aggregation of interest data associated with a second type of aggregation of interest may be received. For example, the second aggregation of interest data may be a second type of aggregation of interest identified in the first configuration file, a new type of aggregation of interest included in a second or subsequent configuration file, and/or a new type of aggregation in an update message to update the existing configuration file. Additionally or alternatively, the second aggregation of interest data may be included in a request from a client device that also includes a request for a particular aggregation, as described herein. The second aggregation of interest data may identify a new type of aggregation of interest (e.g., a type of aggregation of interest different from the type identified in the first aggregation of interest data) and/or a change to or removal of a type of aggregation of interest from the first aggregation of interest data.

As shown in FIG. 3, at step 330, process 300 may include determining a key for each data entry (e.g., each event or transaction). For example, transaction service provider system 102 may determine a first key associated with each transaction of the plurality of payment transactions based on a first portion of the transaction data associated with each transaction and the first aggregation of interest data. For example, the first portion of the transaction data may be selected to uniquely identify each transaction and include some information relevant to (e.g., usable in the determination/calculation of) the type of aggregation of interest so that relevant transactions may be quickly identified (e.g., when sorted, as described herein) in response to a user request for a particular aggregation. For example, if the type of aggregation of interest is a count of device identifications (DeviceIDs) associated with a particular IP address, the key for each transaction may include a compound string in the form of IP:Timestamp (where IP is the IP address for each transaction and Timestamp is the time of each transaction), and other portions of the data for each transaction (e.g., DeviceId, UserID, PAN, etc.) may be stored as values associated with each key of the respective transaction. For the purpose of illustration, the system (e.g., transaction service provider system 102) may be tasked with computing a large number of concurrent aggregations (e.g., hundreds of aggregations for a single payment transaction event) with extremely low latency (e.g., within tens of milliseconds (ms), less than 10 ms, 2 ms, 1 ms, etc.). As such, highly efficient data organization may be useful to improve data access and reduce computation. Additionally or alternatively, the data structure may be extensible such that new data sources may be incorporated, new types of aggregations may be incorporated/determined, and/or new stream operations may be incorporated (e.g., in response to receiving a new configuration file, as described herein). In some non-limiting embodiments, the data/data structure may be stored in a distributed in-memory cache, as described herein, to allow scalability (e.g., in response to increased demand from new data sources, new types of aggregations of interest, and/or new requests for particular aggregations). Accordingly, a key-value pair may be used for efficiently organizing and/or storing the data (e.g., transaction data), and such data may be accessed via keyed access (e.g., value=map.get (key), as described herein) with O(1) complexity (where O is "Big O" notation, e.g., the order of function). For example, using keyed access may, in some instances, avoid and/or obviate the need for searching/scanning operations, which can be expensive in terms of computational resources (e.g., having complexity at O(N) scale, where N is the number of the data elements in the system).

In some non-limiting embodiments, for an incoming payment transaction, based on the types of aggregations identified in the aggregation of interest data, the key(s) for the payment transaction may correspond to different aggregations for faster access and aggregation computations, as described herein. When a request for a particular aggregation (e.g., "What is the count of DeviceIDs associated with the IP address 10.1.2.3 in the past 5 minutes?") is received, as described herein, the transaction data for the transactions relevant to determining/calculating that aggregation can be readily identified, as described herein.

In some non-limiting embodiments, additional keys for each transaction may be determined. For example, transaction service provider system 102 may determine a second key associated with each transaction of the plurality of payment transactions based on a second portion of the transaction data associated with each transaction and the second aggregation of interest data. For the purpose of illustration, the first key may be the compound string of IP:Timestamp, as described above, and the second aggregation of interest may be a count of card uses in a particular time period. In such an illustrative scenario, the second key may be the account identifier/PAN, a compound string of the account identifier/PAN and the time (e.g., PAN:Timestamp), and/or the like.

As shown in FIG. 3, at step 340, process 300 may include storing the data in a map data structure. For example, transaction service provider system 102 may store the transaction data in a map data structure associating the key(s) for each transaction with the values of (at least some of) the remaining portions of the transaction data for each transaction, as described herein. In some non-limiting embodiments, transaction service provider system 102 may use a first portion of the data to determine the key for each transaction, as described herein, and may store a second portion of the transaction data associated with each transaction in a map data structure based on the first key of the respective transaction of the plurality of payment transactions, wherein the first portion of the transaction data and the second portion of the transaction data are different.

In some non-limiting embodiments, at least onetime duration of interest may be determined (e.g., by transaction service provider system 102) based on the first aggregation of interest data associated with the type of aggregation of interest. For example, the type of aggregation of interest may be most commonly requested for time periods of certain durations or less than a certain duration (e.g., up to one day/24 hours, or up to one week, and/or the like), and therefore the time duration of interest may be a portion of that certain duration (e.g., a time duration of interest of one hour, and/or a time duration of interest of one day, and/or the like, respectively).

Additionally or alternatively, the map data structure may be divided (e.g., by transaction service provider system 102) into a plurality of time-based map data structures, and each time-based map data structure may include a plurality of keys and the corresponding second portion of the transaction data associated with a subset of the plurality of payment transactions such that the plurality of keys includes all keys associated with a time period having a time duration equal to the time duration of interest, wherein the time period for each second plurality of keys is different than the time period for each other second plurality of keys. For example, if the time duration of interest is one hour, a map data structure may be divided into 24 one-hour time-based map data structures per day, and a first one-hour time-based data structure may have all keys and corresponding second portions of the transaction data for all transactions within a first hour of the day (e.g., timestamp between 00:00 and 01:00), a second one-hour time-based data structure may have all keys and corresponding second portions of the transaction data for all transactions within a second hour of the day (e.g., timestamp between 01:00 and 02:00), etc.

Additionally or alternatively, the plurality of time-based map data structures may be stored (e.g., by transaction service provider system 102) on a plurality of servers. In some non-limiting embodiments, each server of the plurality of servers may store at least one of the time-based map data structures. For example, if the map data structure is divided into 24 one-hour time-based map data structures, each time-based map data structure may be stored on its own server (e.g., 24 servers, each with one time-based map data structure stored thereon).

In some non-limiting embodiments, the second portion of the transaction data may include one or more additional keys (e.g., a second key based on second aggregation of interest data, as described herein) for each transaction. The second key may be stored in association with each transaction in the time-based map data structure based on the first key (e.g., just as any other part of the second portion of the transaction data, as described herein). Additionally, the first key and the second key may be different. For example, the first key may be a compound string including the Timestamp and a first portion of the data, as described herein, and the second key may be based on a second portion of the data (that may or may not be a compound string with the Timestamp).

In some non-limiting embodiments, older data (e.g., transaction data) may be moved to a separate long-term/persistent storage, as described herein. For example, an indication of a first time period may be received (e.g., at transaction service provider system 102 from a client device). For the purpose of illustration, the first time period may be a maximum time period after which data should be moved to long-term/persistent storage (e.g., 1 day/24 hours, 1 week/7 days, or the like). A plurality of keys associated with a second time period before the first time period may be determined (e.g., keys corresponding to transactions older than 1 day/24 hours, 1 week/7 days, or the like, respectively). The second plurality of keys and the second transaction data associated with each transaction corresponding to the second plurality of keys may be stored in a long-term/persistent storage. The long-term storage may be different than the map data structure. Additionally or alternatively, the second plurality of keys and the corresponding second transaction data may be removed from the map data structure.

In some non-limiting embodiments, the raw data (e.g., raw transaction data) may be separately stored in a long-term/persistent storage. The long-term storage may be different than the map data structure. For example, if new aggregation of interest data is received, the raw data or a portion thereof may be used to determine new/additional keys for each transaction and/or as a source of an additional portion of the transaction data to be stored in the map data structure corresponding to the existing or new keys. Additionally or alternatively, the raw data may be used as a backup in the event that the map data structure becomes corrupted, unavailable, and/or the like.

As shown in FIG. 3, at step 345, process 300 may include sorting the keys. For example, the first keys associated with the plurality of payment transactions may be sorted based on the first aggregation of interest data. For example, the keys may be determined based on the first aggregation of interest data, and the keys may be sorted by an in-order insert operation.

For the purpose of illustration, in some non-limiting embodiments, transaction service provider system 102 may proactively create a sorted map data structure with keys. For example, the key may include compound string based on a first portion of the transaction data as described herein (e.g., IP:Timestamp as a key stored in a map with corresponding values for the second portions of the data, such as DeviceId, UserID, PAN, and/or the like). Using key(s) to identify each transaction provides the advantage of allowing for relatively fast and easy sorting. For example, keys may be sorted by an in-order insert operation in O(Log N) time. Additionally, after sorting, the sorted keys provide the advantage of allowing for quickly identifying the range of relevant data entries (e.g., payment transactions) in the sorted map data structure by binary searching with O(Log N) time.

In some non-limiting embodiments, if there are multiple keys for each transaction (e.g., first and second keys), each set of keys may be sorted separately. For example, second keys associated with the plurality of payment transactions may be sorted based on second aggregation of interest data (separately from the first plurality of keys being sorted based on the first aggregation of interest data).

In some non-limiting embodiments, the map data structure may be divided into a plurality of time-based map data structures, as described herein. Each time-based map data structure may be sorted, as described herein, thereby resulting in a plurality of time-based sorted map data structures.

In some non-limiting embodiments, for the purpose of illustration, time-based sorted map data structures, as described herein, may be used for efficiently transforming and storing raw event data (e.g., transaction data) to accelerate the data aggregation operations with constant time complexity. Such time-based sorted map data structures provide the advantage of reducing the data access time. For example, since each time-based sorted map data structure contains only a portion of the total number of entries (e.g., only entries for payment transactions that occurred during the time period corresponding to each time-based sorted map data structure), the number of N (e.g., the number of entries in each map data structure) is thereby reduced compared to a single map data structure for all entries. For the purpose of illustration, with a time period having a duration of one hour, the transaction data for each day may be divided into 24 one-hour time-based sorted maps, each of which may have an index. For example, the index may be key_entities_hourIndex, where hourIndex is Unix time divided by the number of milliseconds in an hour. Such time-based sorted maps provide at least the following advantages. First, as described above, each time-based sorted map may have a smaller N value. Furthermore, each time-based sorted map may be further allocated to different servers for a distributed in-memory caching, as described herein, which improves the parallelism for concurrent operations and relieves the memory demands for individual servers. Additionally, depending on the time duration of interest (which may be received from/defined by the user or dynamically determined based on user requests), the time period for each time-based map data structure may be dynamically adjusted to balance between data granularity (e.g., more precise if smaller time periods) and overhead/demands on computing resources (e.g., proactively calculating and storing too many small time periods may devote excessive computing resources). Thus, time-based sorted map data structures provide the advantage of speeding up the data aggregation time (i.e. e.g., reducing latency).

As shown in FIG. 3, at step 350, process 300 may include calculating aggregation values for predetermined time periods. For example, based on the type of aggregation of interest, there may be at least one time duration of interest, and aggregation values for each complete time period having a time duration equal to at least one of the time duration(s) of interest may be determined. For the purpose of illustration, for at least one time duration of interest (e.g., one hour, one day, and/or the like), aggregations for each time period of that duration (e.g., each one-hour period, each one-day period, and/or the like) may be determined.

In some non-limiting embodiments, the map data structure may be divided into a plurality of time-based map data structures stored on a plurality of servers, as described herein. For example, each server may calculate a value of the aggregation(s) of interest based on at least one of the plurality of keys and the corresponding second portion of the transaction data associated with each transaction of the subset of the payment transactions stored thereon. Additionally, each server may store the value(s) of such aggregation(s). In some non-limiting embodiments, if a user request for a particular aggregation that spans multiple predetermined time periods is received, the final value of the aggregation may be determined based on the values of the aggregations for the predetermined time periods stored on each server within the time period of the requested aggregation. Additionally or alternatively, if some portion of the requested time period does not correspond to a complete predetermined time period, the key(s) and/or corresponding second portion of the transaction data corresponding to transactions within that portion of the requested time period may be used to determine the partial aggregation for that portion of the requested time period, and the final value of the aggregation may be determined based on the value of the partial aggregation and the values of the aggregations for the predetermined time periods stored on each server within the time period of the requested aggregation.

In some non-limiting embodiments, for the purpose of illustration, a time-based sorted map data structure provides the advantage of speeding up the data aggregation time (e.g., reducing latency), as described herein. Additionally, proactively calculating some aggregations (e.g., the value of aggregation(s) for each of the time-based map data structures, as described herein) provides the advantage of speeding up aggregation time and the advantage of balancing latency (e.g., faster aggregation times when more aggregations are proactively calculated) with overhead/demands on computational resources (e.g., proactively calculating and storing too many small time periods may require excessive computing resources). For example, when a user request for an aggregation is received, the aggregation values for each of the predetermined time periods (e.g., from each of the time-based sorted map data structures) may be used for determining a portion of the final value of the requested aggregation (without re-evaluating the keys/data in such time-based sorted map data structures) and only the portion of the requested aggregation that is outside of the predetermined time periods (e.g., not a complete predetermined time period) must be evaluated (e.g., searched to identify relevant keys to then separately calculate the portion of the aggregation), thereby limiting the event level (e.g., individual transaction data entries) to be evaluated to generate the final aggregation value. As such, the computational complexity of aggregation computations may approach O(1) constant time. For example, to answer an aggregation request such as "What is the sum of purchase amounts associated with the IP address 10.1.2.3 in the past 5 hours?" at 6:30 AM (assuming one-hour predetermined time periods), the final aggregation value may be determined based on the sum of predetermined aggregation values (e.g., predetermined total purchase amount) from each time-based sorted map data structure corresponding to the one-hour periods from 02:00-06:00 added to purchase amount values identified for the (ad-hoc) periods of 1:30-2:00 and 6:00-6:30 to create the final aggregation result.

In some non-limiting embodiments, a first set of aggregation values based on the transaction data associated with a first subset of the plurality of transactions associated with each of a plurality of first predetermined time periods may be calculated, and a second set of aggregation values based on the transaction data associated with a second subset of the plurality of transactions associated with each of a plurality of second predetermined time periods may be calculated. Additionally, a user request for a desired aggregation may include time period data associated with a first time period of interest. Based thereon, an intermediate value based on a first plurality of first keys associated with a third subset of the plurality of payment transactions may be calculated, wherein the third subset of the plurality of transactions is associated with a portion of the first time period of interest outside of the plurality of first predetermined time periods and the plurality of second predetermined time periods. The final value of the requested aggregation may be based on a subset of the first set of aggregation values within the first time period of interest, a subset of the second set of aggregation values within the first time period of interest, and the intermediate value. For example, the first predetermined time periods may each have a first duration and the second predetermined time periods may each have a second duration greater than the first duration. For the purpose of illustration, the first duration may be an hour and the second duration may be a day. Additionally, the subset of the second set of aggregation values may be associated with complete second predetermined time periods (e.g., complete days) within the first time period of interest, the subset of the first set of aggregation values may be associated with complete first predetermined time periods (e.g., complete hours) within a remaining portion of the first time period of interest (e.g., a first portion of the time period of interest outside of a second portion of the time period of interest corresponding to the subset of the second set of aggregation values), and the intermediate value may be determined/calculated based entries (e.g., transactions) corresponding to keys associated with entries (e.g., transactions) within the portion of the time period of interest that does not correspond to complete first and/or second predetermined time periods (e.g., a third portion of the time period of interest outside of the first portion and the second portion).

As shown in FIG. 3, at step 360, process 300 may include communicating at least one value of at least one aggregation based on a user request. Each value may be based (at least partially) on a plurality of the keys associated with a subset of the plurality of payment transactions based on the user request. Additionally or alternatively, the first value may further be based on the second portion of the transaction data associated with each of the first keys associated with the subset of payment transactions. For example, the final value of a requested aggregation may be communicated (e.g., from transaction service provider system 102 to a client device from which the request was received) after the final value of the aggregation is determined/calculated, as described herein.

In some non-limiting embodiments, a first user request may be received (e.g., at transaction service provider system 102) from a user client (e.g., a client device), and the user request may include a request for a value based on (first) aggregation of interest data associated with the type of aggregation of interest and time period data associated with a first time period of interest. A plurality of the keys may be identified based on the first aggregation of interest data and the time period data. For example, keys corresponding to transactions in the time period of interest having at least one attribute relevant to the aggregation of interest may be identified, as described herein. The value may be calculated based on the keys and/or the second portion of the transaction data associated with the keys, as described herein. That value may then be communicated to the user client, as described herein.

In some non-limiting embodiments, the data may be divided into time-based sorted map data structures stored on separate servers, as described herein. Additionally or alternatively, intermediate aggregation values may be determined for each of a plurality of predetermined time periods, as described herein. In some non-limiting embodiments, in response to receiving a user request with a time period of interest, a plurality of intermediate values from respective predetermined periods within the time period of interest may be communicated as well as the value of an (ad-hoc) aggregation for transactions within the time period of interest that are outside of the predetermined time periods, as described herein. For purpose of illustration, to answer an aggregation request such as "What is the sum of purchase amounts associated with the IP address 10.1.2.3 in the past 5 hours?" at 6:30 AM (assuming one-hour predetermined time periods), intermediate predetermined aggregation values (e.g., predetermined total purchase amount) from each time-based sorted map data structures corresponding to the one-hour periods from 02:00-06:00 may be transmitted, and sum of the purchase amount values identified for the (ad-hoc) periods of 1:30-2:00 and 6:00-6:30 may also transmitted, and the device that receives the transmissions (e.g., a user client) may add the intermediate predetermined values with the sum to create the final aggregation result.

In some non-limiting embodiments, a transaction may be evaluated based on the aggregation(s) communicated. For example, the value may be representative of historical information associated with the various attributes of the transaction. For the purpose of illustration, many previous valid transactions from the same device (e.g., same DeviceID and/or same IP address) may indicate a new transaction from that same device is unlikely (or less likely) to be fraudulent. In contrast, many declined transactions and/or failed login attempts from an unknown device may indicate a new transaction from that same device is likely (or more likely) to be fraudulent (e.g., an attack by a third party). Decision/scoring systems (e.g., risk scoring systems) may process many requests very quickly (e.g., millions per day and/or thousands per second), so it may be useful for data representing historical activities to be aggregated on demand efficiently and quickly for effective use in various decision/scoring models (e.g., risk scoring models). For example, to detect a potentially fraudulent transaction, aggregations may be used to determine a number of PANs related to an IP address in various time periods (e.g., past 10 seconds, 1 minute, 1 hour, etc.), a number of unique IP addresses associated with a particular PAN in various time periods, a total transaction amount for a particular PAN in various time periods, a maximum risk score and/or a minimum risk score associated with a particular PAN in various time periods, a number of distinct account identifiers associated with a particular device identifier in various time periods, and/or the like.

In some non-limiting embodiments, computations (e.g., determining and/or calculating the value of the requested aggregation) may be performed at the system/device (e.g., server of transaction service provider system 102) where data is stored, and only the requests (identifying the type/time period of aggregation(s) desired) and final values of the aggregations are communicated, rather than communicating the data itself (or results of intermediate calculations determined thereon), all of which provide the advantage of reducing the computation latencies that may otherwise be problematic in distributed computing environments. For example, Apache Spark may improve the performance of Hadoop by putting data in memory, but large amounts of data may still be transferred from servers to servers to generate final outputs. In contrast, in some non-limiting embodiments, the disclosed subject matter not only stores transaction data in a distributed in-memory cache but also communicates computational tasks (e.g., requests for aggregations) to the data instead of moving data within the network. In some non-limiting embodiments, the disclosed subject matter may therefore achieve reduced latency (e.g., less than 10 ms, 2 ms, 1 ms, less than 1 ms, etc.) on average for individual requests that may contain over 200 concurrent aggregations of a single payment transaction.

For the purpose of illustration, in some traditional data pulling-based designs, an aggregation client may (based on a specific aggregation task) derive keys, indices, and/or the like to retrieve the relevant data from remote servers, and after the data is transferred, then the necessary computations to generate final aggregation results may be performed. However, under such techniques, while the system may quickly identify the relevant data in the memory on remote servers, the cost of retrieving/transferring data from remote servers accumulates to increase aggregation latency significantly. In contrast, according to some non-limiting embodiments of the disclosed subject matter, advantages of increased efficiency may be gained by in-memory data computation (e.g., performing computation at server(s) where data is stored) and communicating requests (e.g., with identifiers of the requested aggregation tasks) to the relevant data (rather than transferring the data). For an aggregation task, according to some non-limiting embodiments of the disclosed subject matter, keys for each data entry (e.g., payment transaction) may be determined, but instead of retrieving the data from remote servers, servers storing relevant portions of the data (e.g., time-based sorted map data structures) may be instructed to compute aggregations using local in-memory data to create the intermediate results, and intermediate results may be collected to compute the final aggregation results (or the intermediate results may be communicated to the requesting device, which can compute the final aggregation result quickly therefrom). Accordingly, network activities may be reduced, for example, by only transmitting requests for an aggregation task and the intermediate/final value of the aggregation, which have much smaller volumes of data transfer and therefore reduce network latency.

In some non-limiting embodiments, the techniques and systems described herein improve storage schema (e.g., improve efficiency of storing data and reduce latency in identifying relevant entries), improve allocation of computing resources and network resources (e.g., compute aggregations directly where the data is stored and communicate only final values), improve parallelization (e.g., allow for distributed storing at multiple servers and/or distributed processing at multiple servers simultaneously), and provide the advantage of low latency and high throughput without overburdening computing resources. For example, the techniques and systems described herein may allow average latency for over tens of thousands concurrent aggregations in less than 10 ms (e.g., 1-2 ms or even less than 1 ms).

For the purpose of illustration, in some non-limiting embodiments, the values of the requested aggregations may be useful in any suitable application for which historical information, trend information, and/or statistical information may be desired. For example, when a customer is making a purchase, the customer may initiate a payment transaction. The payment transaction may be communicated to a risk scoring engine (e.g., a computer system that uses at least one scoring model to evaluate the risk of fraud in a transaction), which, for example, may be a part of transaction service provider system 102, issuer system 104, merchant system 108, and/or acquirer system 102. The scoring engine may request one or more aggregations, the values of which may be variables in its risk models. An aggregation engine (e.g., a computer system configured to perform process 300 completely or partially) may provide the values of the requested aggregations, as described herein. The scoring engine may generate a risk score based on aggregation data (e.g., use the aggregation values as input for its scoring model(s)). Based on the risk score, the transaction may be approved (e.g., if the risk score is below a threshold) or denied (e.g., if the risk score is above a threshold). In some non-limiting embodiments, a risk score for an incoming transaction may rely on various aggregation values such as PAN usage count, total transaction amount, and/or the like, some of which may be time-window based (e.g., in the past 5 minutes, 1 hour, 1 day, 1 week, 1 month, etc.), and aggregations for each time window may be calculated with low latency (e.g., within a few milliseconds, as described herein) in order to be available quickly enough to flag a transaction while the transaction is being processed/authorized.

In some non-limiting embodiments, the techniques and systems described herein may be applied for other types of events, messages, and/or interactions involving any device(s), system(s), network(s), and/or combinations thereof, even if unrelated to payment transactions. For the purpose of illustration, a proprietor of a website may receive event data associated with a plurality of click events. For example, each click may be associated with particular content that is clicked (e.g., advertisement images, product images, article text, video frames, and/or any other suitable piece of information displayed visually). Values of aggregations related to click events may represent popularity of the content clicked. For example, if the content is a product image, aggregation information related to click events associated therewith may represent popularity of the product, which the proprietor of the website may use to evaluate and/or automate product management decisions (e.g., ordering more stock of popular items or ordering less stock of unpopular items). Additionally or alternatively, a merchant with locations spread out in various areas of the country may use event data aggregation (e.g., click data, as described above, in-store inventory data, and/or the like) to proactively move products closer to regions where they are more popular or even move an individual product to a location closer to an individual customer, for example, to reduce shipping time. In some non-limiting embodiments, service providers (e.g., analytics agencies, credit reporting agencies, investigative agencies, and/or the like) may use aggregations to produce reports on various metrics (e.g., distribution of credit scores of different age groups) or use aggregations to determine values of variables for scoring models. In some non-limiting embodiments, aggregation values may be used as inputs in any other suitable setting, e.g., real-time analytics, marketing, advertisement, machine learning, and/or the like.

Figure 4:
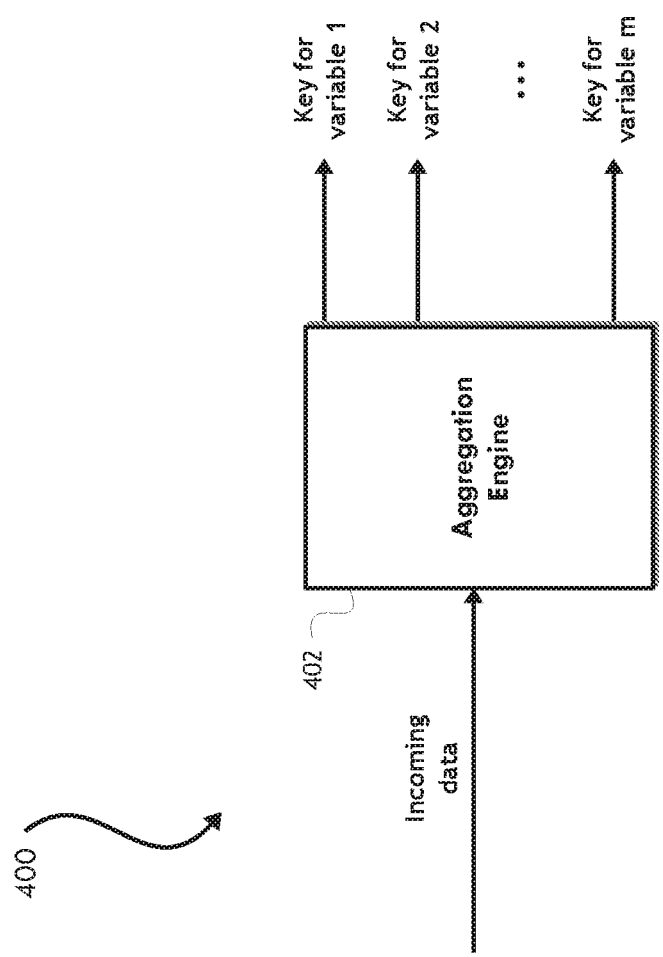
FIG. 4 is a diagram of an implementation of non-limiting embodiments of the process shown in FIG. 3.

Referring now to FIG. 4, FIG. 4 is a diagram of an overview of non-limiting embodiments of an implementation 400 relating to process 300 shown in FIG. 3. As shown in FIG. 4, implementation 400 includes aggregation engine 402. Aggregation engine 402 may be the same as or similar to transaction service provider 102. Additionally or alternatively, aggregation engine 402 may be configured to perform (e.g., completely, partially, and/or the like) process 300. In some non-limiting embodiments, aggregation engine 402 may receive data (e.g., transaction data associated with a plurality of transactions), as described herein. Additionally or alternatively, aggregation engine 402 may determine at least one key for each data entry (e.g., each transaction of the plurality of transactions), as described herein. For example, aggregation engine 402 may determine m keys for each transaction (where m is the number of keys), and each key may be based on at least one aggregation of interest identified in aggregation of interest data.

Figure 5:
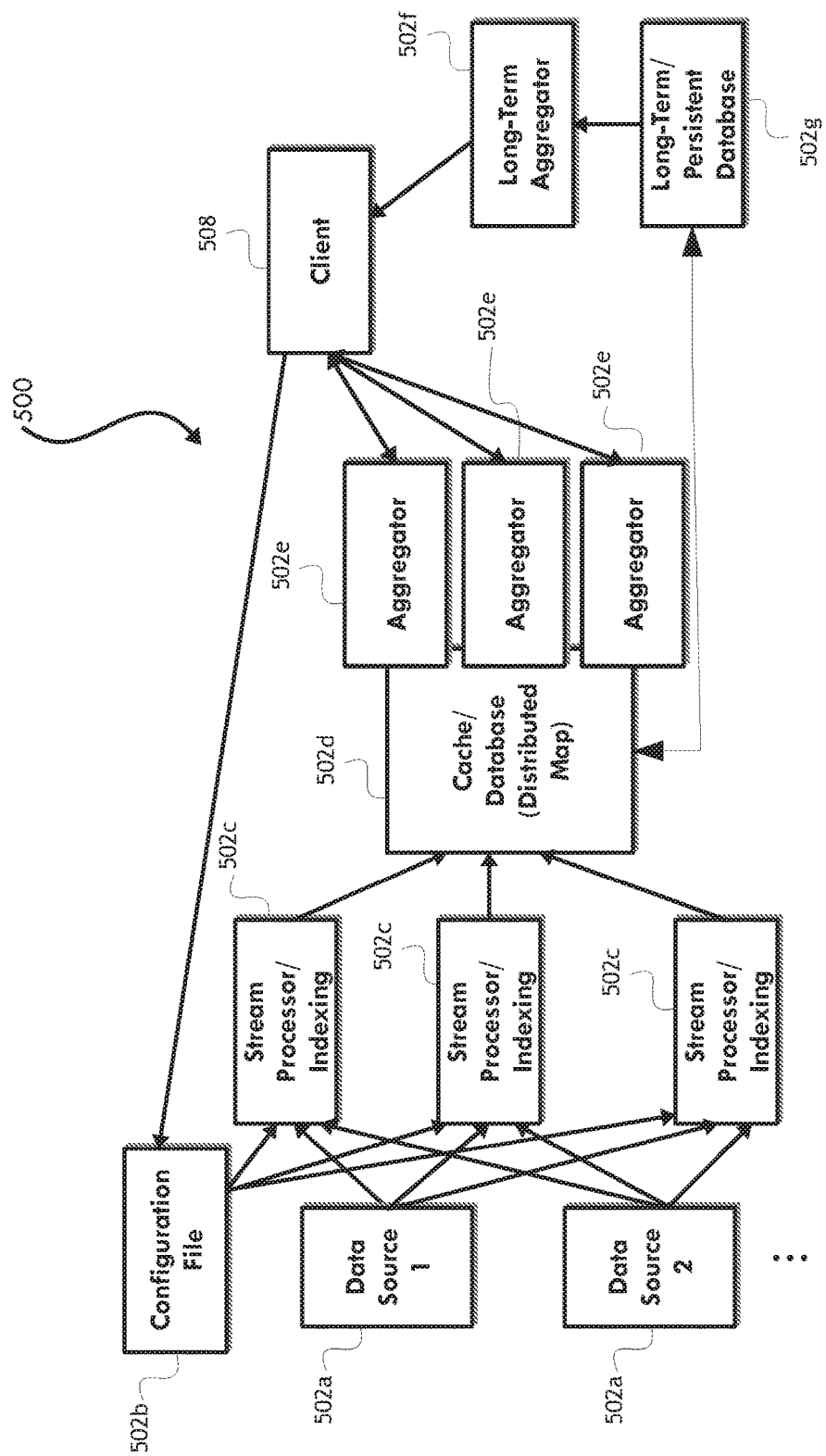
FIG. 5 is a diagram of an implementation of non-limiting embodiments of the process shown in FIG. 3.

Referring now to FIG. 5, FIG. 5 is a diagram of an overview of non-limiting embodiments of an implementation 500 relating to process 300 shown in FIG. 3. As shown in FIG. 5, implementation 500 may include at least one data source 502a, at least one configuration file 502b, at least one stream processor 502c, at least one cache/database 502d, at least one aggregator 502e, at least one long-term aggregator 502f, at least one long-term database 502g, and at least one client 508. For example, data source 502a, configuration file 502b, stream processor 502c, cache/database 502d, aggregator 502e, long-term aggregator 502f, and long-term database 502g may be the same as or similar to devices and/or portions of transaction service provider system 102, as described herein. In some non-limiting embodiments, client 508 may be the same as or similar to a device and/or portion of merchant system 108. Additionally or alternatively, client 508 may be the same as or similar to a device of issuer system 104, a customer device 106, a device of acquirer system 110, and/or another device of transaction service provider system 102.

In some non-limiting embodiments, implementation 500 may employ Lambda architecture (e.g., combination of cache/high-speed storage for recent/real-time data in cache/database 502d and persistent/batch storage for older/cold data in long-term database 502g) and microservices architecture (e.g., separate, independently deployable modules, such as data source 502a, configuration file 502b, stream processor 502c, cache/database 502d, aggregator 502e, long-term aggregator 502f, and/or long-term database 502g), either or both of which may provide advantages of a complete, flexible, and dynamic framework to support various data aggregations, as described herein. In some non-limiting embodiments, Lambda architecture may take advantage of both batch and streaming processing, where data for and aggregations within the most recent 24 hours may be stored and/or processed by the real-time component (e.g., cache/database 502d), while data and aggregations for the period before the most recent 24 hours (e.g., from days to years in the past) may be stored and/or processed by a batch aggregation engine (e.g., long-term aggregator 502f).

In some non-limiting embodiments, the data source(s) 502a may be streams and/or messages directly from an electronic payment network, as described herein. Additionally or alternatively, at least one data source 502a may be a database, an API coupled to another device and/or system, and/or a messaging cluster, as described herein. For example, data source(s) 502a may include various data source connectors such as Kafka consumers, Hadoop/HDFS data readers, and/or the like to retrieve raw data.

In some non-limiting embodiments, configuration file 502b may be received from a client device (e.g., client 508), and the configuration file may include aggregation of interest data, as described herein. Additionally or alternatively, an initial and/or default configuration file may be provided with initial and/or default aggregation of interest data.

In some non-limiting embodiments, each stream processor 502c may act as a data ingestion service. For example, stream processor(s) 502c may determine one or more keys for each data entry (e.g., payment transaction), as described herein. Additionally or alternatively, stream processor(s) 502c may filter and/or encrypt the data (or portions thereof), as described herein. For example, for the data filtering, relevant fields may be determined based on configuration files, user requests, and/or other user inputs and other (non-relevant) fields may be filtered out, as described herein. Additionally, to handle sensitive/private data, sensitive/private fields may be determined based on configuration files, user requests, and/or other user inputs, and such fields may be encrypted (and any fields not so designated may remain in clear text/transparent), as described herein. In some non-limiting embodiments, stream processor 502c may sort the key(s), as described herein.

The key(s) for each data entry (e.g., payment transaction) and, optionally, the corresponding second/remaining portion of the data for each data entry may be stored in the cache/database 502d, as described herein. For example, the cache/database 502d may include at least one server, and the keys/data may be stored in time-based sorted map data structures, as described herein. In some non-limiting embodiments, to reduce aggregation delay, reduce data access latency, provide flexibility/configurability, improve system performance, improve scalability, and/or provide higher availability, the cache database 502d may include a pluggable interface for different distributed in-memory caching systems/techniques (e.g., Redis, Hazelcast, Apache Ignite, and/or the like).

In some non-limiting embodiments, aggregator 502e may determine and/or communicate the value of a requested aggregation to the requesting client device (e.g., client 508), as described herein. Additionally or alternatively, a plurality of aggregators 502e (e.g., on a plurality of servers, as described herein) may each provide an intermediate aggregation value (e.g., values for predetermined portions/time periods of data and/or values of portions/time periods of data outside of predetermined periods) and communicate the intermediate aggregation values to the client (e.g., client 508) to combine/process the intermediate aggregation values to determine the final aggregation value, as described herein. In some non-limiting embodiments, the aggregators 502e may leverage on the data locality, thereby reducing network activity for the aggregation calculation and directly perform aggregations on the local in-memory data for the underlying distributed in-memory caching systems, as described herein.

In some non-limiting embodiments, long-term aggregator 502f may perform aggregations on older data that is stored in (or moved to) long-term database 502g. For example, while cache/database 502d and aggregators 502e may be used for aggregations for real-time/recent data and be selected/configured for low latency for critical/urgent short-term aggregations, the long term aggregator 502f may be selected/configured for providing diverse (in terms of functions, complexity, and time scale) aggregations that are less critical/urgent. For example, long term aggregator 502f may operate on a batch cycle (e.g., hourly, daily, and/or the like). Implementation 500 may therefore combine short-term/real-time aggregations with longer-term/batch aggregations in a single interface/implementation to support various decision making queries.

In some non-limiting embodiments, older event data (e.g., transaction data) may be stored on or moved to long-term database 502g, which may be a persistent database separate from the cache/database 502d, as described herein. Additionally or alternatively, raw, preprocessed event data (e.g., transaction data) and/or or post-processed event data may be stored in the long-term database 502g for the purpose of faster cache data recovery (e.g., backup) and/or as a source of new/additional keys and/or as a source of an additional portion of the transaction data to be stored in the map data structure based on new aggregation of interest data, as described herein. Additionally or alternatively, the data in long-term database 502g may be used for opportunistic further data preprocessing for complex aggregations.

In some non-limiting embodiments, client 508 may be one or more client devices, as described herein. For example, client 508 may be a device of merchant system 108. Additionally or alternatively, client 508 may be a device of issuer system 104, a customer device 106, a device of acquirer system 110, and/or another device of transaction service provider system 102.

Figure 6:
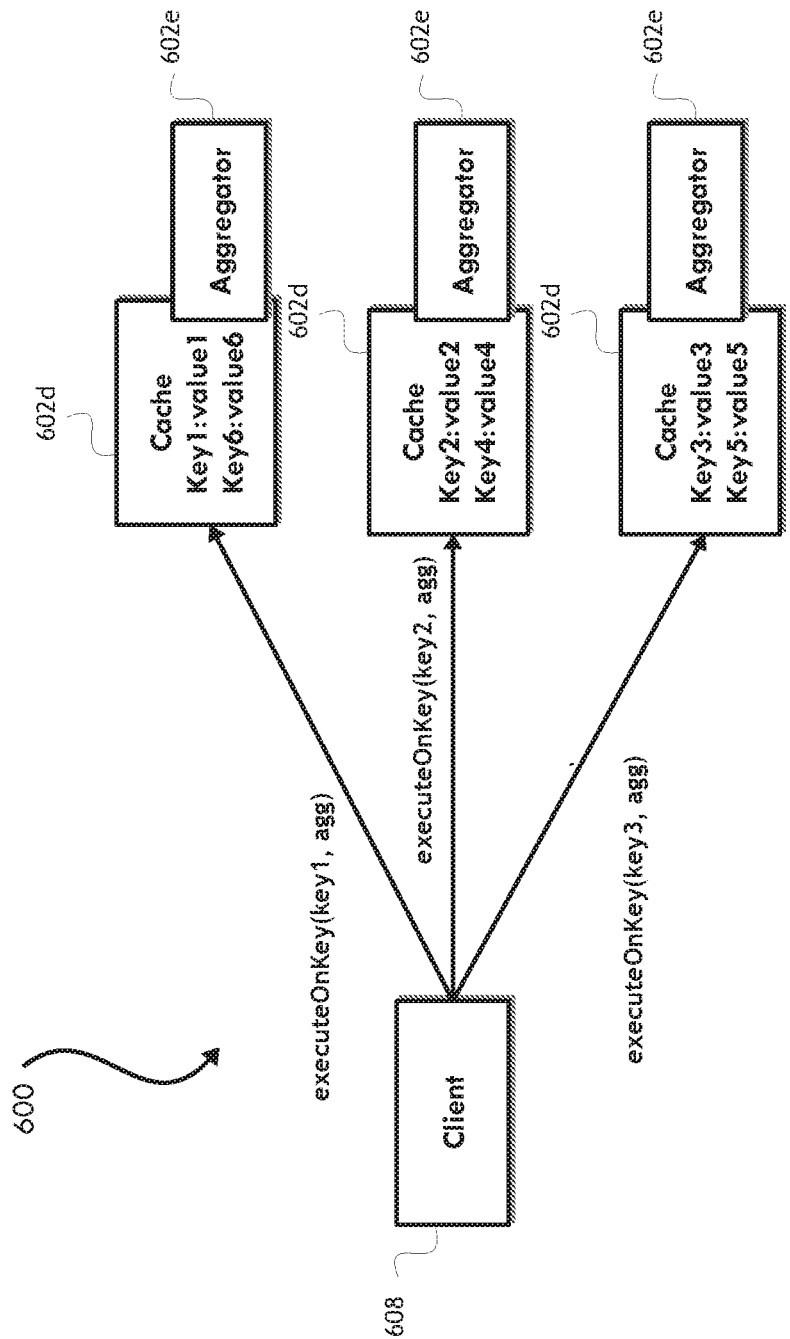
FIG. 6 is a diagram of an implementation of non-limiting embodiments of the process shown in FIG. 3.

Referring now to FIG. 6, FIG. 6 is a diagram of an overview of non-limiting embodiments of an implementation 600 relating to process 300 shown in FIG. 3. As shown in FIG. 6, implementation 600 may include at least one client 608, at least one cache/database 602d, and/or at least one aggregator 602e. In some non-limiting embodiments, client 608 may be the same as or similar to the client 508, as described herein. In some non-limiting embodiments, each cache/database 602d may be the same as or similar to cache/database 502d, as described herein. In some non-limiting embodiments, aggregator 602e may be the same as or similar to aggregator 502e, as described herein.

In some non-limiting embodiments, as shown in FIG. 6, the client 608 may send a request (e.g., "executeOnKey (key1, agg)," "executeOnKey(key2, agg)," "executeOnKey (key3, agg)," etc.) identifying a requested aggregation (e.g., based on the content of the field "agg"), as described herein. Additionally or alternatively, if the event data (e.g., transaction data) is stored on multiple servers, the request may further include information identifying the key or range of keys (e.g., based on the content of the fields "key1," "key2," "key3," etc.) for each server. In some non-limiting embodiments, aggregator 602e may determine/calculate the value of the aggregation (or an intermediate value thereof based on the information stored on that particular server), as described herein. Additionally or alternatively, aggregator 602e may communicate the value of the aggregation (or the intermediate value thereof) to the client 608, as described herein.

Figure 7:
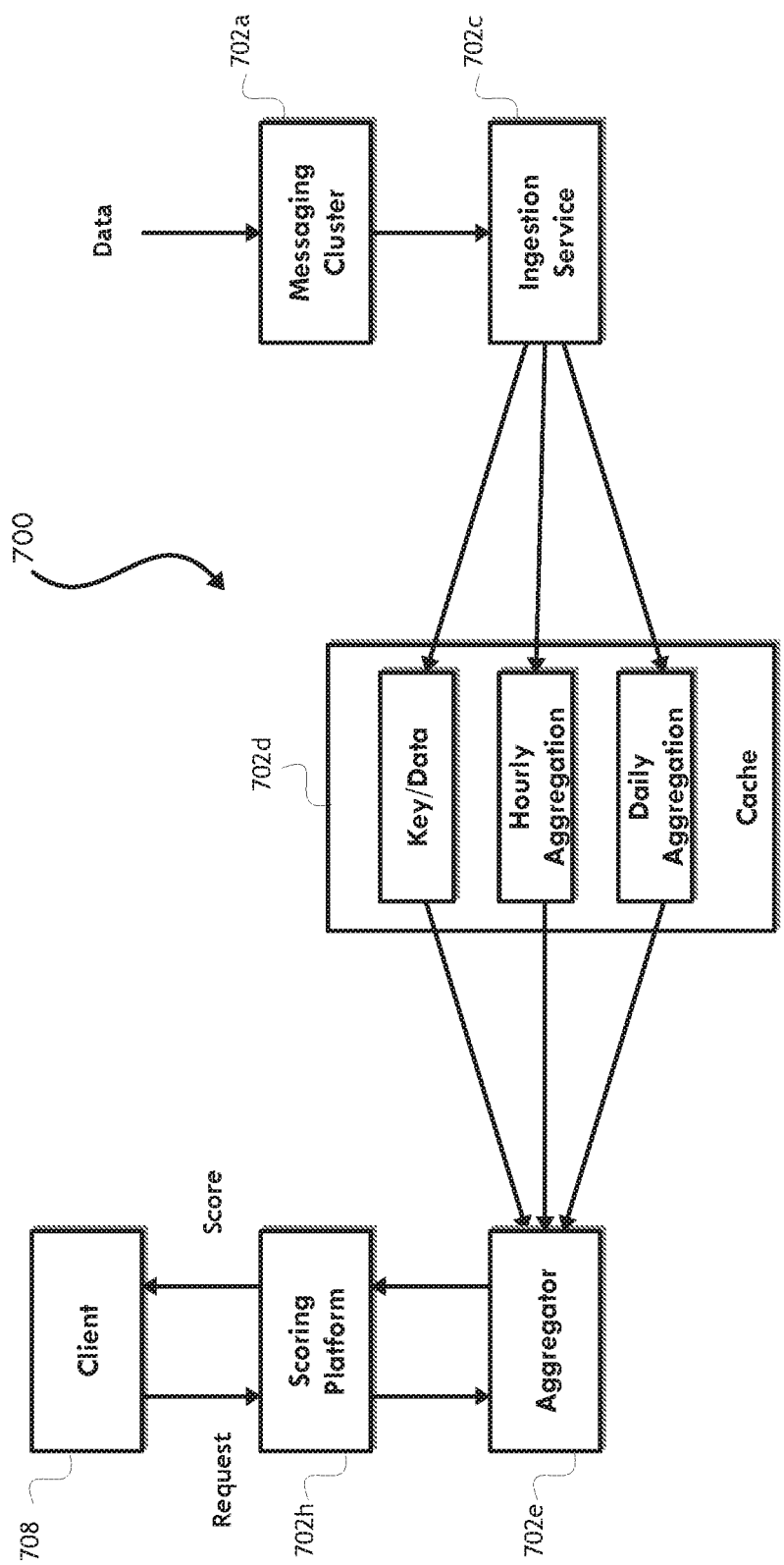
FIG. 7 is a diagram of an implementation of non-limiting embodiments of the process shown in FIG. 3.

Referring now to FIG. 7, FIG. 7 is a diagram of an overview of non-limiting embodiments of an implementation 700 relating to process 300 shown in FIG. 3. As shown in FIG. 7, implementation 700 may include messaging cluster 702a, ingestion service 702c, cache 702d, aggregator 702e, scoring platform 702h, and/or client 708. In some non-limiting embodiments, messaging cluster 702a may be the same as or similar to data source 502a. Additionally or alternatively, messaging cluster 702a may be any suitable messaging cluster and/or data source connector, as described herein. In some non-limiting embodiments, ingestion service 702c may be the same as or similar to stream processor 502c. In some non-limiting embodiments, cache 702d may be the same as or similar to cache/database 502d. In some non-limiting embodiments, aggregator 702e may be the same as or similar to aggregator 502e. In some non-limiting embodiments, client 708 may be the same as or similar to client 508.

In some non-limiting embodiments, messaging cluster 702a may provide streams and/or messages to be received by the ingestion service 702c, as described herein. For example, messaging cluster 702a may include various data source connectors such as Kafka consumers, Hadoop/HDFS data readers, and/or the like to retrieve raw data and provide such data to the ingestion service 702c.

In some non-limiting embodiments, ingestion service 702c may determine one or more keys for each data entry (e.g., payment transaction), as described herein. Additionally or alternatively, ingestion service 702c may filter and/or encrypt the data (or portions thereof), as described herein. In some non-limiting embodiments, ingestion service 702c may sort the key(s), as described herein. In some non-limiting embodiments, ingestion service 702c may also proactively update aggregations for current predetermined time periods (e.g., hourly, daily, and/or the like) stored in the cache 702d, as described herein.

The key(s) for each data entry (e.g., payment transaction) and, optionally, the corresponding second/remaining portion of the data for each data entry may be stored in the cache 702d, as described herein. Additionally or alternatively, aggregation values for predetermined periods (e.g., first and second predetermined periods) may be stored in the cache 702d. For example, as shown in FIG. 7, the first predetermined period may be one hour and the second predetermined period may be one day, as described herein. In some non-limiting embodiments, hourly and daily aggregations may be stored in cache 702d, as described herein.

In some non-limiting embodiments, aggregator 702e may determine and/or communicate the value of a requested aggregation to the requesting device (e.g., scoring platform 702h), as described herein.

In some non-limiting embodiments, scoring platform 702h may be a scoring engine or any device/system having a scoring model, as described herein. For example, scoring platform 702h may be a part of transaction service provider system 102. Additionally or alternatively, scoring platform may be a part of issuer system 104, merchant system 108, and/or acquirer system 102. The scoring platform 702h may request one or more aggregations, the values of which may be inputs for variables in its scoring models, as described herein. Based on the risk score, the transaction may be approved (e.g., if the risk score is below a threshold) or denied (e.g., if the risk score is above a threshold).

In some non-limiting embodiments, client 708 may be one or more client devices, as described herein. For example, client 708 may be a device of transaction service provider system 102. Additionally or alternatively, client 708 may be a device of issuer system 104, a customer device 106, a device of merchant system 108, and/or a device of acquirer system 110.

Figure 8:
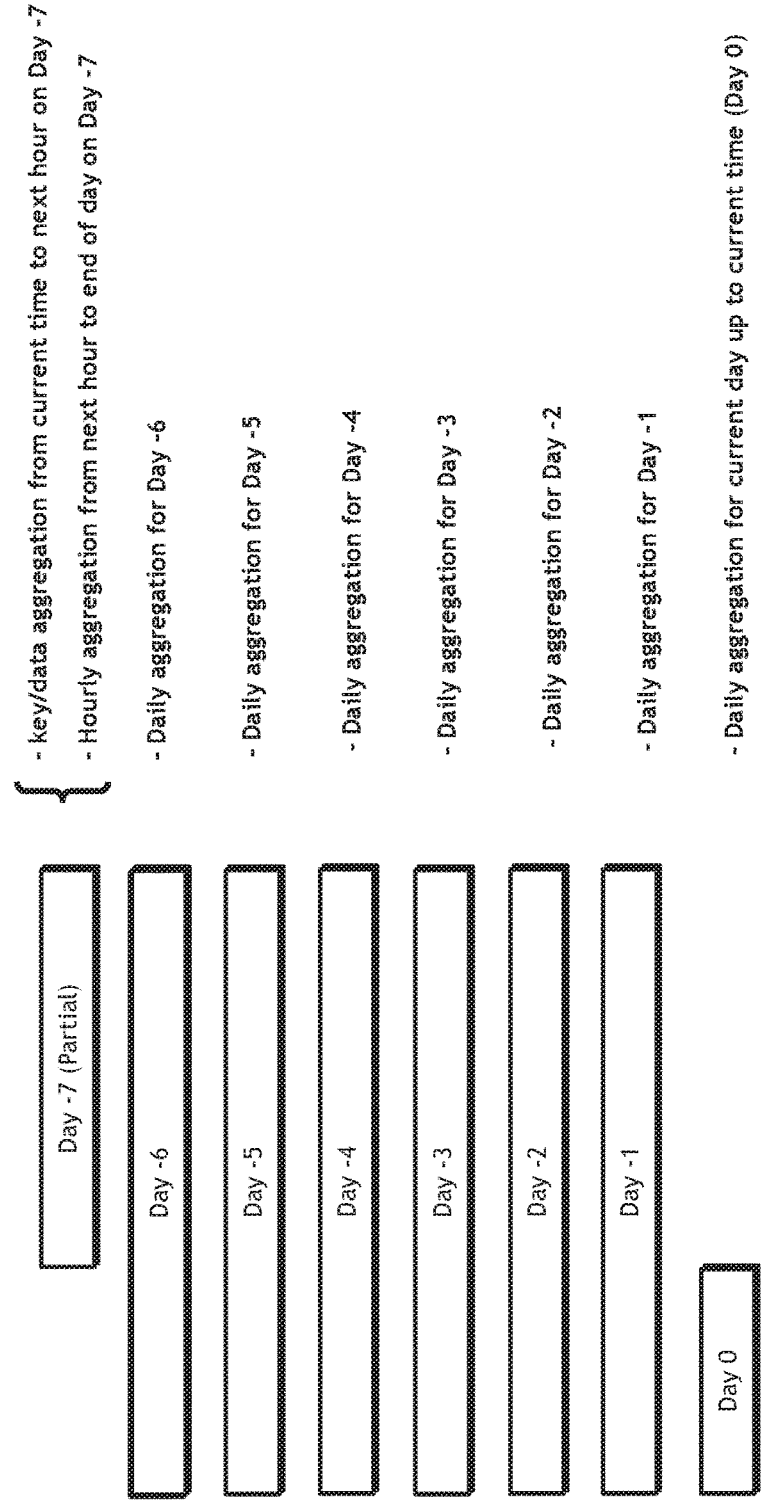
FIG. 8 is a diagram of a seven-day data aggregation according to non-limiting embodiments of the process shown in FIG. 3.

Referring now to FIG. 8, FIG. 8 is a diagram of an overview of non-limiting embodiments of an aggregation 800 relating to process 300 shown in FIG. 3. For example, a request for an aggregation may indicate a time period of interest of 1 week, e.g., the 7-day period looking back from the current time (e.g., a current time of 10:30:33:345 GMT), and predetermined calculations may be calculated for each first time period (e.g., hourly) and each second time period (e.g., daily). For purpose of illustration, for the current day (Day 0), aggregations for the day and the current hour may be updated for each transaction during the day and hour, respectively. At the end of the respective time period (e.g., end of the current day or end of the current hour), the complete aggregation for that time period may be stored and a new aggregation may be created for the now-current time period (e.g., the next day or next hour, respectively). Thus, upon receipt of the request for the aggregation, the daily aggregation for the current day (Day 0) up to the current time is already stored and therefore available. Additionally, the daily aggregations for the previous full days in the period (Day −1 to Day −6) are also already stored and therefore available. For the portion of the day at the beginning of the period (Day −7), hourly aggregations are also already stored and therefore available for each complete hour within the portion of that day (Day −7). In addition, the intermediate aggregation value for the portion of the time period of interest between the current time (e.g., 10:30:33:345 GMT) and the next full hour (e.g., 11:00:00:000 GMT) may be calculated based on the keys and/or remaining portions of the event data (e.g., transaction data) corresponding to events (e.g., transactions) in that portion of the time period, as described herein. Thus, as shown in FIG. 8, the key/data may be used to determine the aggregation for the period from 10:30:33:345 GMT to 10:50:59:000 GMT (He e.g., just before the next hour starting at 11:00:00:00 GMT), hourly aggregations may be used for the time period from 11:00:00:000 GMT to the of the day at the beginning of the period (Day −7), and daily aggregations may be used for the remaining days (full days Day −6 to Day −1 and partial Day 0). The final aggregation value may be obtained by combining the key/data aggregation, hourly aggregations, and daily aggregations. Additionally, in some non-limiting embodiments, the key/data aggregation, hourly aggregations, and daily aggregations may all be determined/retrieved in parallel.

In some non-limiting embodiments, the techniques of the disclosed subject matter may provide the advantages of extremely low aggregation latency, high throughput, high availability, and scalability, all of which may be due, at least in part, to the data structures described herein, efficient storage, sorting, and determination of aggregations described herein, efficient use of computing and network resources described herein, and/or parallelization described herein. In some non-limiting embodiments, the techniques of the disclosed subject matter may be used to determine complex aggregations, combinations of aggregations, various stream joins, and/or the like, and may further allow users to add their own customized aggregation functions. In some non-limiting embodiments, the techniques described herein may be used in either or both of Structured Query Language (SQL) and non-SQL databases.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for aggregating data from payment transactions, comprising:
   receiving, with a plurality of stream processors, transaction data associated with a plurality of payment transactions, each stream processor of the plurality of stream processors comprising at least one first processor, wherein each stream processor of the plurality of stream processors receives a respective portion of the transaction data associated with the plurality of payment transactions, wherein each stream processor of the plurality of stream processors comprises a respective computing device of a plurality of separate computing devices each acting as a data ingestion service;
   receiving, with the plurality of stream processors, first aggregation of interest data associated with a type of aggregation of interest;
   filtering, with the plurality of stream processors, a portion of the transaction data based on the first aggregation of interest data, wherein the portion of the transaction data is discarded to provide a remaining portion of the transaction data;
   determining, with the plurality of stream processors, a time duration of interest based on the first aggregation of interest data associated with the type of aggregation of interest;
   determining, with the plurality of stream processors, a first key associated with each transaction of the plurality of payment transactions based on a first portion of the remaining portion of the transaction data associated with each transaction of the plurality of payment transactions and the first aggregation of interest data;
   storing, with the plurality of stream processors, the first keys associated with the plurality of payment transactions in a map data structure in a cache, the cache comprising a plurality of servers, wherein storing the first keys comprises:
      dividing the map data structure into a plurality of time-based map data structures, each time-based map data structure comprising a second plurality of the first keys associated with a second subset of the plurality of payment transactions, each second plurality of the first keys comprising all first keys associated with a time period having a time duration equal to the time duration of interest, wherein the time period for each second plurality of the first keys is different than the time period for each other second plurality of the first keys;
      dynamically adjusting the time period for each time-based map data structure to reduce latency; and
      storing the plurality of time-based map data structures on the plurality of servers, wherein each server of the plurality of servers stores at least one of the time-based map data structures;
   storing, with the plurality of stream processors, a second portion of the remaining portion of the transaction data associated with each transaction of the plurality of payment transactions in the plurality of time-based map data structures on the plurality of servers based on the first key of a respective transaction of the plurality of payment transactions, wherein the first portion of the remaining portion of the transaction data and the second portion of the remaining portion of the transaction data are different, and wherein each time-based map data structure stores the second portion of the remaining portion of the transaction data corresponding to the second plurality of the first keys stored of the time-based map data structure;
   sorting, with the plurality of stream processors, the first keys associated with the plurality of payment transactions stored in the cache based on the first aggregation of interest data;
   proactively calculating, with at least one aggregator of a plurality of aggregators, a first set of aggregation values based on the remaining portion of the transaction data associated with the second subset of the plurality of payment transactions associated with each of a plurality of first predetermined time periods, the plurality of aggregators comprising an aggregator for each server of the plurality of servers for the cache, and the at least one aggregator of the plurality of aggregators comprising at least one second processor different from the at least one first processor;
   proactively calculating, with the at least one aggregator of the plurality of aggregators, a second set of aggregation values based on the remaining portion of the transaction data associated with a third subset of the plurality of payment transactions associated with each of a plurality of second predetermined time periods;
   receiving, with the at least one aggregator, a first user request from a scoring engine;
   reactively determining, with the at least one aggregator, a first value based on a first plurality of the first keys associated with a first subset of the plurality of payment transactions based on the first user request, wherein the first user request comprises time period data associated with a first time period of interest, wherein determining the first value comprises:
      calculating, with the at least one aggregator, a second value based on the first plurality of the first keys associated with the first subset of the plurality of payment transactions, wherein the first subset of the plurality of payment transactions is associated with a portion of the first time period of interest outside of the plurality of first predetermined time periods and the plurality of second predetermined time periods; and calculating, with the at least one aggregator, the first value based on a subset of the first set of aggregation values within the first time period of interest, a subset of the second set of aggregation values within the first time period of interest, and the second value, wherein each of the plurality of first predetermined time periods has a first duration and each of the plurality of second predetermined time periods has a second duration, wherein the second duration is greater than the first duration, and wherein the first duration is an hour and the second duration is a day;

communicating, with the at least one aggregator, the first value based on the first user request to the scoring engine;

generating, with the scoring engine, a risk score based on the first value received from the at least one aggregator;

determining, with the scoring engine, that an incoming transaction is a fraudulent transaction based on the risk score; and denying, with at least one of a transaction service provider system, an issuer system, a merchant system, or an acquirer system, the incoming transaction based on determining the transaction is a fraudulent transaction.

2. The method of claim 1, wherein the first value is further based on the second portion of the remaining portion of the transaction data associated with each key of the first plurality of the first keys associated with the first subset of the plurality of payment transactions.

3. The method of claim 1, further comprising:
calculating at each server of the plurality of servers, a second value based on at least one of the second plurality of the first keys and the second portion of the remaining portion of the transaction data corresponding thereto associated with each transaction of the second subset of the plurality of payment transactions stored thereon; and
storing at each server of the plurality of servers, the second value.

4. The method of claim 1, further comprising:
receiving, with the plurality of stream processors, second aggregation of interest data associated with a second type of aggregation of interest;
determining, with the plurality of stream processors, a second key associated with each transaction of the plurality of payment transactions based on the second portion of the remaining portion of the transaction data associated with each transaction of the plurality of payment transactions and the second aggregation of interest data, wherein storing the second portion of the remaining portion of the transaction data comprises storing, with the plurality of stream processors, the second key associated with each transaction of the plurality of payment transactions in the map data structure based on the first key of the respective transaction of the plurality of payment transactions, wherein the first key and the second key are different; and
sorting, with the plurality of stream processors, the second keys associated with the plurality of payment transactions based on the second aggregation of interest data.

5. The method of claim 1, further comprising:
receiving, with the at least one aggregator from a user client, the first user request, the first user request comprising a request for the first value based on the first aggregation of interest data associated with the type of aggregation of interest and time period data associated with the first time period of interest;
identifying, with the at least one aggregator, the first plurality of the first keys based on the first aggregation of interest data and the time period data; and
calculating, with the at least one aggregator, the first value based on the first plurality of the first keys.

6. The method of claim 1, further comprising, after receiving the transaction data associated with the plurality of payment transactions and before determining the first key associated with each transaction of the plurality of payment transactions, at least one of:
filtering, with the plurality of stream processors, a third portion of the remaining portion of the transaction data associated with each transaction of the plurality of payment transactions; and
encrypting, with the plurality of stream processors, the transaction data associated with each transaction of the plurality of payment transactions.

7. A system for aggregating data from payment transactions, comprising:
a cache;
a plurality of stream processors, each stream processor of the plurality of stream processors comprising at least one first processor, the plurality of stream processors programmed or configured to:
receive, from an electronic payment network, transaction data associated with a plurality of payment transactions, wherein each stream processor of the plurality of stream processors receives a respective portion of the transaction data associated with the plurality of payment transactions, wherein each stream processor of the plurality of stream processors comprises a respective computing device of a plurality of separate computing devices each acting as a data ingestion service;
receive, from a client device, first aggregation of interest data associated with a type of aggregation of interest;
filter a portion of the transaction data based on the first aggregation of interest data, wherein the portion of the transaction data is discarded to provide a remaining portion of the transaction data;
determine a time duration of interest based on the first aggregation of interest data associated with the type of aggregation of interest;
determine a first key associated with each transaction of the plurality of payment transactions based on a first portion of the remaining portion of the transaction data associated with each transaction of the plurality of payment transactions and the first aggregation of interest data;
store the first keys associated with the plurality of payment transactions in a map data structure in the cache, the cache comprising a plurality of servers, wherein when storing the first keys, the plurality of stream processors are further programmed or configured to:
divide the map data structure into a plurality of time-based map data structures, each time-based map data structure comprising a second plurality of the first keys associated with a second subset of the plurality of payment transactions, each second plurality of the first keys comprising all first keys associated with a time period having a time duration equal to the time duration of interest, wherein the time period for each second plurality of the first keys is different than the time period for each other second plurality of the first keys;

dynamically adjust the time period for each time-based map data structure to reduce latency; and store the plurality of time-based map data structures on the plurality of servers, wherein each server of the plurality of servers stores at least one of the time-based map data structures;

store a second portion of the remaining portion of the transaction data associated with each transaction of the plurality of payment transactions in the plurality of time-based map data structures on the plurality of servers based on the first key of the respective transaction of the plurality of payment transactions, wherein the first portion of the remaining portion of the transaction data and the second portion of the remaining portion of the transaction data are different, and wherein each time-based map data structure stores the second portion of the remaining portion of the transaction data corresponding to the second plurality of the first keys stored of the time-based map data structure; and sort the first keys associated with the plurality of payment transactions stored in the cache based on the first aggregation of interest data; and at least one aggregator of a plurality of aggregators comprising at least one second processor different from the at least one first processor, the at least one aggregator of the plurality of aggregators programmed or configured to:

proactively calculate a first set of aggregation values based on the remaining portion of the transaction data associated with the second subset of the plurality of payment transactions associated with each of a plurality of first predetermined time periods, the plurality of aggregators comprising an aggregator for each server of the plurality of servers for the cache;

proactively calculate a second set of aggregation values based on the remaining portion of the transaction data associated with a third subset of the plurality of payment transactions associated with each of a plurality of second predetermined time periods;

receive a first user request from a scoring engine;

reactively determine a first value based on a first plurality of the first keys associated with a first subset of the plurality of payment transactions based on the first user request, wherein the first user request comprises time period data associated with a first time period of interest, and wherein when determining the first value, the at least one aggregator of the plurality of aggregators is further programmed or configured to:

calculate a second value based on the first plurality of the first keys associated with the first subset of the plurality of payment transactions, wherein the first subset of the plurality of payment transactions is associated with a portion of the first time period of interest outside of the plurality of first predetermined time periods and the plurality of second predetermined time periods; and calculate the first value based on a subset of the first set of aggregation values within the first time period of interest, a subset of the second set of aggregation values within the first time period of interest, and the second value, wherein each of the plurality of first predetermined time periods has a first duration and each of the plurality of second predetermined time periods has a second duration, wherein the second duration is greater than the first duration, and wherein the first duration is an hour and the second duration is a day;

communicate, to the client device, the first value based on the first user request to the scoring engine;

at least one processor of a scoring engine programmed or configured to:
generate a risk score based on the first value received from the at least one aggregator; and
determine that an incoming transaction is a fraudulent transaction based on the risk score; and at least one processor of a transaction service provider system, an issuer system, a merchant system, or an acquirer system programmed or configured to:
deny the incoming transaction based on determining the transaction is a fraudulent transaction.

8. The system of claim 7, wherein the first value is further based on the second portion of the remaining portion of the transaction data associated with each key of the first plurality of the first keys associated with the first subset of the plurality of payment transactions.

9. The system of claim 7, wherein each of the plurality of servers is programmed or configured to:
calculate a second value based on at least one of the second plurality of the first keys and the second portion of the remaining portion of the transaction data corresponding thereto associated with each transaction of the second subset of the plurality of payment transactions stored thereon; and
store the second value.

10. A computer program product for aggregating data from payment transactions, the computer program product comprising at least one non-transitory computer-readable medium including one or more instructions that, when executed by at least one processor, cause the at least one processor to:

receive, at a plurality of stream processors from an electronic payment network, transaction data associated with a plurality of payment transactions, each stream processor of the plurality of stream processors comprising at least one first processor of the at least one processor, wherein each stream processor of the plurality of stream processors receives a respective portion of the transaction data associated with the plurality of payment transactions, wherein each stream processor of the plurality of stream processors comprises a respective computing device of a plurality of separate computing devices each acting as a data ingestion service;

receive, at the plurality of stream processors from a client device, first aggregation of interest data associated with a type of aggregation of interest;

filter, at the plurality of stream processors, a portion of the transaction data based on the first aggregation of interest data, wherein the portion of the transaction data is discarded to provide a remaining portion of the transaction data;

determine, at the plurality of stream processors, a time duration of interest based on the first aggregation of interest data associated with the type of aggregation of interest;

determine, at the plurality of stream processors, a first key associated with each transaction of the plurality of payment transactions based on a first portion of the remaining portion of the transaction data associated with each transaction of the plurality of payment transactions and the first aggregation of interest data;

store, at the plurality of stream processors, the first keys associated with the plurality of payment transactions in a map data structure in a cache, the cache comprising a plurality of servers, wherein when storing the first keys the one or more instructions further cause the at least one processor to:
  divide the map data structure into a plurality of time-based map data structures, each time-based map data structure comprising a second plurality of the first keys associated with a second subset of the plurality of payment transactions, each second plurality of the first keys comprising all first keys associated with a time period having a time duration equal to the time duration of interest, wherein the time period for each second plurality of the first keys is different than the time period for each other second plurality of the first keys;
  dynamically adjusting the time period for each time-based map data structure to reduce latency; and
  store the plurality of time-based map data structures on the plurality of servers, wherein each server of the plurality of servers stores at least one of the time-based map data structures;
store, at the plurality of stream processors, a second portion of the remaining portion of the transaction data associated with each transaction of the plurality of payment transactions in the plurality of time-based map data structures on the plurality of servers based on the first key of the respective transaction of the plurality of payment transactions, wherein the first portion of the remaining portion of the transaction data and the second portion of the remaining portion of the transaction data are different, and wherein each time-based map data structure stores the second portion of the remaining portion of the transaction data corresponding to the second plurality of the first keys stored of the time-based map data structure; and
sort, at the plurality of stream processors, the first keys associated with the plurality of payment transactions stored in the cache based on the first aggregation of interest data;
proactively calculate, at at least one aggregator of a plurality of aggregators, a first set of aggregation values based on the remaining portion of the transaction data associated with the second subset of the plurality of payment transactions associated with each of a plurality of first predetermined time periods, the plurality of aggregators comprising an aggregator for each server of the plurality of servers for the cache, and the at least one aggregator of the plurality of aggregators comprising at least one second processor of the at least one processor different from the at least one first processor;
proactively calculate, at the at least one aggregator of the plurality of aggregators, a second set of aggregation values based on the remaining portion of the transaction data associated with a third subset of the plurality of payment transactions associated with each of a plurality of second predetermined time periods;
receive a first user request from a scoring engine;
reactively determine, at the at least one aggregator of the plurality of aggregators, a first value based on a first plurality of the first keys associated with a first subset of the plurality of payment transactions based on the first user request, wherein the first user request comprises time period data associated with a first time period of interest, wherein when determining the first value, the one or more instructions further cause the at least one processor to:
  calculate a second value based on the first plurality of the first keys associated with the first subset of the plurality of payment transactions, wherein the first subset of the plurality of payment transactions is associated with a portion of the first time period of interest outside of the plurality of first predetermined time periods and the plurality of second predetermined time periods; and
  calculate the first value based on a subset of the first set of aggregation values within the first time period of interest, a subset of the second set of aggregation values within the first time period of interest, and the second value, wherein each of the plurality of first predetermined time periods has a first duration and each of the plurality of second predetermined time periods has a second duration, wherein the second duration is greater than the first duration, and wherein the first duration is an hour and the second duration is a day;
communicate, at the at least one aggregator, a first value based on a first plurality of the first keys associated with a first subset of the plurality of payment transactions based on a first user request to the scoring engine;
generate a risk score based on the first value received from the at least one aggregator;
determine that an incoming transaction is a fraudulent transaction based on the risk score; and
deny the incoming transaction based on determining the transaction is a fraudulent transaction.

11. The computer program product of claim 10, wherein the first value is further based on the second portion of the remaining portion of the transaction data associated with each key of the first plurality of the first keys associated with the first subset of the plurality of payment transactions.

12. The computer program product of claim 10, wherein the one or more instructions, when executed by the at least one processor, further cause the at least one processor to:
  calculate, at each server of the plurality of servers, a second value based on at least one of the second plurality of the first keys and the second portion of the remaining portion of the transaction data corresponding thereto associated with each transaction of the second subset of the plurality of payment transactions stored thereon; and
  store, at each server of the plurality of servers, the second value.

* * * * *

UNITED STATES PATENT AND TRADEMARK OFFICE
CERTIFICATE OF CORRECTION

| | | |
|---|---|---|
| PATENT NO. | : 12,354,091 B2 | Page 1 of 1 |
| APPLICATION NO. | : 16/963675 | |
| DATED | : July 8, 2025 | |
| INVENTOR(S) | : Yu Gu et al. | |

It is certified that error appears in the above-identified patent and that said Letters Patent is hereby corrected as shown below:

On the Title Page

Column 1, item (71) Applicant, Line 1, Delete "Associatio," and insert -- Association, --

Signed and Sealed this
Thirtieth Day of December, 2025

John A. Squires
*Director of the United States Patent and Trademark Office*